US011372190B2

(12) United States Patent
Lin

(10) Patent No.: US 11,372,190 B2
(45) Date of Patent: Jun. 28, 2022

(54) CAMERA DEVICE HAVING CLAMPING PORTIONS AND MOVABLE CARRIER

(71) Applicants: Sintai Optical (Shenzhen) Co., Ltd., ShenZhen (CN); Asia Optical Co., Inc., Taichung (TW)

(72) Inventor: Guo-Quan Lin, ShenZhen (CN)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 878 days.

(21) Appl. No.: 16/198,916

(22) Filed: Nov. 23, 2018

(65) Prior Publication Data
US 2019/0212520 A1 Jul. 11, 2019

(30) Foreign Application Priority Data

Jan. 5, 2018 (CN) .......................... 201820017085.8
Feb. 7, 2018 (CN) .......................... 201820215207.4
Feb. 13, 2018 (CN) .......................... 201820257186.2
Mar. 22, 2018 (CN) .......................... 201820393292.3
Jun. 12, 2018 (TW) ................................ 107120171

(51) Int. Cl.
| G02B 7/02 | (2021.01) |
| G02B 7/09 | (2021.01) |
| G02B 23/08 | (2006.01) |
| G02B 27/64 | (2006.01) |
| G03B 17/12 | (2021.01) |
| H04N 5/232 | (2006.01) |

(52) U.S. Cl.
CPC ............... *G02B 7/021* (2013.01); *G02B 7/09* (2013.01); *G02B 23/08* (2013.01); *G02B 27/646* (2013.01); *G03B 17/12* (2013.01); *G03B 2205/0015* (2013.01); *H04N 5/23287* (2013.01)

(58) Field of Classification Search
CPC . G02B 7/02; G02B 7/021; G02B 7/08; G02B 7/09; G02B 13/0065; G02B 23/08; G03B 17/12; G03B 17/17; G03B 2205/0053
See application file for complete search history.

(56) References Cited

U.S. PATENT DOCUMENTS

| 9,766,426 B2 | 9/2017 | Lam | |
| 2016/0109681 A1* | 4/2016 | Lam | G02B 7/28 359/824 |

FOREIGN PATENT DOCUMENTS

| CN | 105785690 A | 7/2016 |
| CN | 106842479 A | 6/2017 |

* cited by examiner

*Primary Examiner* — Ryan S Dunning
(74) *Attorney, Agent, or Firm* — McClure, Qualey & Rodack, LLP

(57) ABSTRACT

A camera device includes a first lens driving module including a first lens unit, a first carrier, a first fixing element, a plurality of clamping portions and a driver. The first lens unit includes at least one lens, and the lens constitutes a first optical axis. The first carrier is configured to carry the first lens unit and includes a plurality of first carrier bodies and a first carrier base. The first fixing element includes a plurality of first fixing bodies and a first fixing base. The clamping portions extend from the first fixing bodies and are connected to the first carrier. The driver is disposed between the first carrier and the first fixing element and is configured to drive the first carrier carrying the first lens unit to move with respect to the first fixing element in a first direction and a second direction.

20 Claims, 22 Drawing Sheets

CAMERA DEVICE HAVING CLAMPING PORTIONS AND MOVABLE CARRIER

BACKGROUND OF THE INVENTION

Field of the Invention

The invention relates to a camera device, and more particularly to a camera device for a periscope.

Description of the Related Art

A conventional image capturing apparatus is provided with a camera device for capturing images. The camera device includes a plurality of lens driving modules and an imaging unit. All the optical elements (e.g. lenses) in the camera device are required to operate normally. To achieve this goal, the relative position of the lens driving modules must be well adjusted during assembly of the camera device, so that the lens driving modules can be arranged along a central axis of the imaging unit. After the relative position of the lens driving modules is well adjusted, the lens driving modules are connected by gluing.

However, the arrangement of the lens driving modules along the central axis of the imaging unit results in an excessive length of the camera device, which is disadvantageous to arrangement of other elements and miniaturization of the image capturing apparatus. Moreover, complicated equipments are required for adjusting the lens driving modules (high cost), assembly of the camera device is time-consuming (low efficiency), and the reliability of assembly of the lens driving modules is poor because the lens driving modules are connected only by gluing.

BRIEF SUMMARY OF THE INVENTION

The invention provides a camera device including an optical turning module for reducing the length of the camera device, so that the camera device can be elastically allocated in the space, and therefore the thickness of the image capturing apparatus is reduced. Moreover, the optical turning module is connected to the lens driving module (or the lens driving module is connected to another lens driving module) through a connecting unit, so as to simplify the assembly of the camera device and enhance the structure of the camera device. In brief, compared to that of the conventional skill, the camera device of the invention preserves thin thickness, yet achieves high strength.

A camera device in accordance with an embodiment of the invention includes a first lens driving module including a first lens unit, a first carrier, a first fixing element, a plurality of clamping portions and a driver. The first lens unit includes at least one lens, and the lens constitutes a first optical axis. The first carrier is configured to carry the first lens unit and includes a plurality of first carrier bodies and a first carrier base. The first fixing element includes a plurality of first fixing bodies and a first fixing base, and the first fixing bodies are connected to the first fixing base. The clamping portions extend from the first fixing bodies towards the first carrier and are connected to the first carrier. The driver is disposed between the first carrier and the first fixing element and is configured to drive the first carrier carrying the first lens unit to move with respect to the first fixing element in a first direction and a second direction. The first direction is parallel to the first optical axis, and the second direction is perpendicular to the first direction.

In another embodiment, the first fixing base has an accommodating space greater than the first carrier base, and the first carrier base is disposed in the first fixing base, and the first fixing base and the first carrier bodies are arranged around the first lens unit and have a center coinciding with the first optical axis to form a partial outer circumferential structure of the first lens unit.

In yet another embodiment, the clamping portions are elongated and flexible, and the first carrier is movably connected to the first fixing element through the clamping portions.

In another embodiment, the first lens driving module further includes a connecting unit, and each of the first fixing bodies includes a main body, a lateral plate, a frontal plate and a back plate. The lateral plate extends upwards from the main body, and the frontal plate and the back plate respectively extend from two ends of the main body and the lateral plate towards another of the first fixing bodies. The frontal plate is provided with a hole, the back plate is provided with a hole, each of the first carrier bodies is provided with a long cut or a through hole, and the connecting unit sequentially passes through the hole of the frontal plate, the long cut or the through hole of the first carrier body and the hole of the back plate. The long cut or the through hole is configured to move with respect to the connecting unit in the first and the second direction.

In yet another embodiment, the first fixing bodies and the first fixing base are connected as one piece by insert molding. The first fixing base includes a first frame portion and a first connecting portion, the first frame portion is a frame, and the first connecting portion extends upwards from the first frame portion and is connected to the first fixing bodies. The first carrier bodies and the first carrier base are connected as one piece by insert molding. The first carrier base includes a second frame portion and a second connecting portion, the second frame portion is a frame, and the second connecting portion extends upwards from the second frame portion and is connected to the first carrier bodies. The second frame portion is disposed in the first frame portion, and a bottom of the first lens unit is disposed in the second frame portion.

In another embodiment, the camera device further includes an optical turning module including an optical turning unit and a second carrier, wherein the optical turning unit is firmly disposed on the second carrier. The first fixing base further includes a third frame portion connected to the first frame portion as one piece, the first fixing bodies includes a plurality of first fixing portions connected to the first frame portion and a plurality of second fixing portions connected to the third frame portion. The first carrier is connected to the first fixing portions and is configured to move with respect to the first fixing portions in the first direction and the second direction, and the second carrier is disposed on the second fixing portions.

In yet another embodiment, the number of the first fixing portions is two, and the first fixing portions are firmly connected to the first frame portion with respect to each other. The number of the second fixing portions is two, and the second fixing portions are firmly connected to the third frame portion with respect to each other. One of the second fixing portions and one of the first fixing portions are formed as one piece on the same side.

In another embodiment, the camera device further includes a second lens driving module, an optical turning module, a frame body and a first imaging unit. The second lens driving module has a second optical axis perpendicular to the first optical axis. The optical turning module is configured to change an optical path of a light beam travelling along the second optical axis for allowing the light beam to arrive the first lens driving module and is connected to the first lens driving module. The frame body includes a plurality of lateral walls, a first lateral wall and the second lateral wall, wherein the lateral walls extend in a direction parallel to the second optical axis, and the first lateral wall and the second lateral wall are arranged along the first optical axis and opposite to each other. The first imaging unit is adjacent to the first lateral wall, wherein the first imaging unit, the first lens driving module, the optical turning module and the second lens driving module are firmly disposed in the frame body.

In yet another embodiment, the first imaging unit, the first lens driving module, the optical turning module and the second lens driving module are arranged along the first optical axis from the first lateral wall to the second lateral wall.

In another embodiment, the first imaging unit, the first lens driving module and the optical turning module are arranged along the first optical axis, the second lens driving module and the optical turning module are arranged in a third direction, and the third direction is perpendicular to the first optical axis and the second optical axis.

In yet another embodiment, the frame body includes a first portion and a second portion, the first portion is configured to accommodate the first lens driving module, the optical turning module and the second driving module, and the second portion is configured to accommodate the first imaging unit.

In another embodiment, the first portion has a first opening end, the second portion has a second opening end, and the first opening end is connected to the second opening end. The first portion includes the second lateral wall, a third lateral wall and a fourth lateral wall, the third lateral wall and the fourth lateral wall are respectively connected to two ends of the second lateral wall, and the second lateral wall is adjacent to the second lens driving module. The second portion includes the first lateral wall, a fifth lateral wall and a sixth lateral wall, and the fifth lateral wall and the sixth lateral wall are respectively connected to two ends of the first lateral wall.

In yet another embodiment, the first lens driving module further includes a first optical element disposed between the first lens unit and the first imaging unit and accommodated by the second portion.

In another embodiment, the frame body further includes a third lateral wall and a fourth lateral wall, the third lateral wall is connected to a first end of the first lateral wall and a first end of the second lateral wall, the fourth lateral wall is connected to a second end of the first lateral wall and a second end of the second lateral wall, the first lateral wall and the second lateral wall are perpendicular to the first optical axis, and the third lateral wall and the fourth lateral wall are arranged symmetrically about the first optical axis. The third lateral wall and the fourth lateral wall are provided with a plurality of through holes, and the through holes are oppositely arranged at two sides of the first lens driving module and the optical turning module. A top surface of the third lateral wall is provided with a cut, a top surface of the fourth lateral wall is provided with another cut, wherein a line passing through two centers of the cuts is perpendicular to the first optical axis. The first lens driving module further includes a first optical element and two fixing members respectively disposed in the cuts, and the first optical element is disposed between the first lens unit and the first imaging unit and is fixed in the frame body through the fixing members. The frame body is 凸-shaped, and the frame body surrounds the first imaging unit, the first lens driving module, the optical turning module and the second lens driving module.

A camera device in accordance with another embodiment of the invention includes a first lens driving module including a first lens unit, a first carrier, a first fixing element, a plurality of clamping portions and a driver. The first lens unit constitutes a first optical axis. The first carrier is configured to carry the first lens unit and includes a plurality of first carrier bodies and a first carrier base. The first fixing element includes a plurality of first fixing bodies and a first fixing base, the first fixing base has an accommodating space greater than the first carrier base, and the first carrier base is disposed in the first fixing base. The clamping portions extend from the first fixing bodies towards the first carrier and are connected to the first carrier. The driver is configured to drive the first carrier to move with respect to the first fixing element in a first direction and a second direction, the first direction is parallel to the first optical axis, and the second direction is perpendicular to the first direction.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
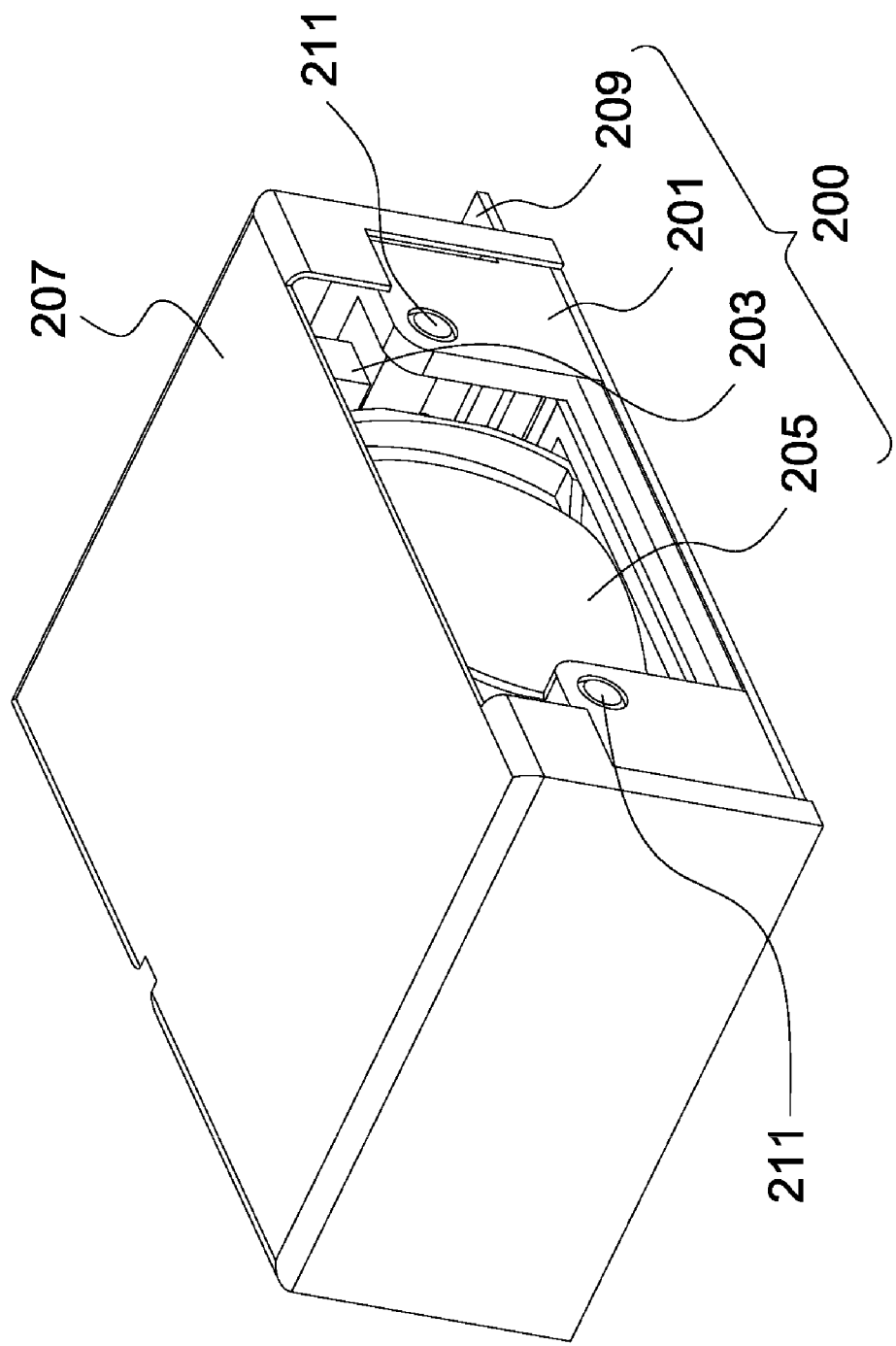
FIG. 1 is a schematic view of a lens driving module and a lens driving cover of a camera device in accordance with a first embodiment of the invention.
Figure 2:
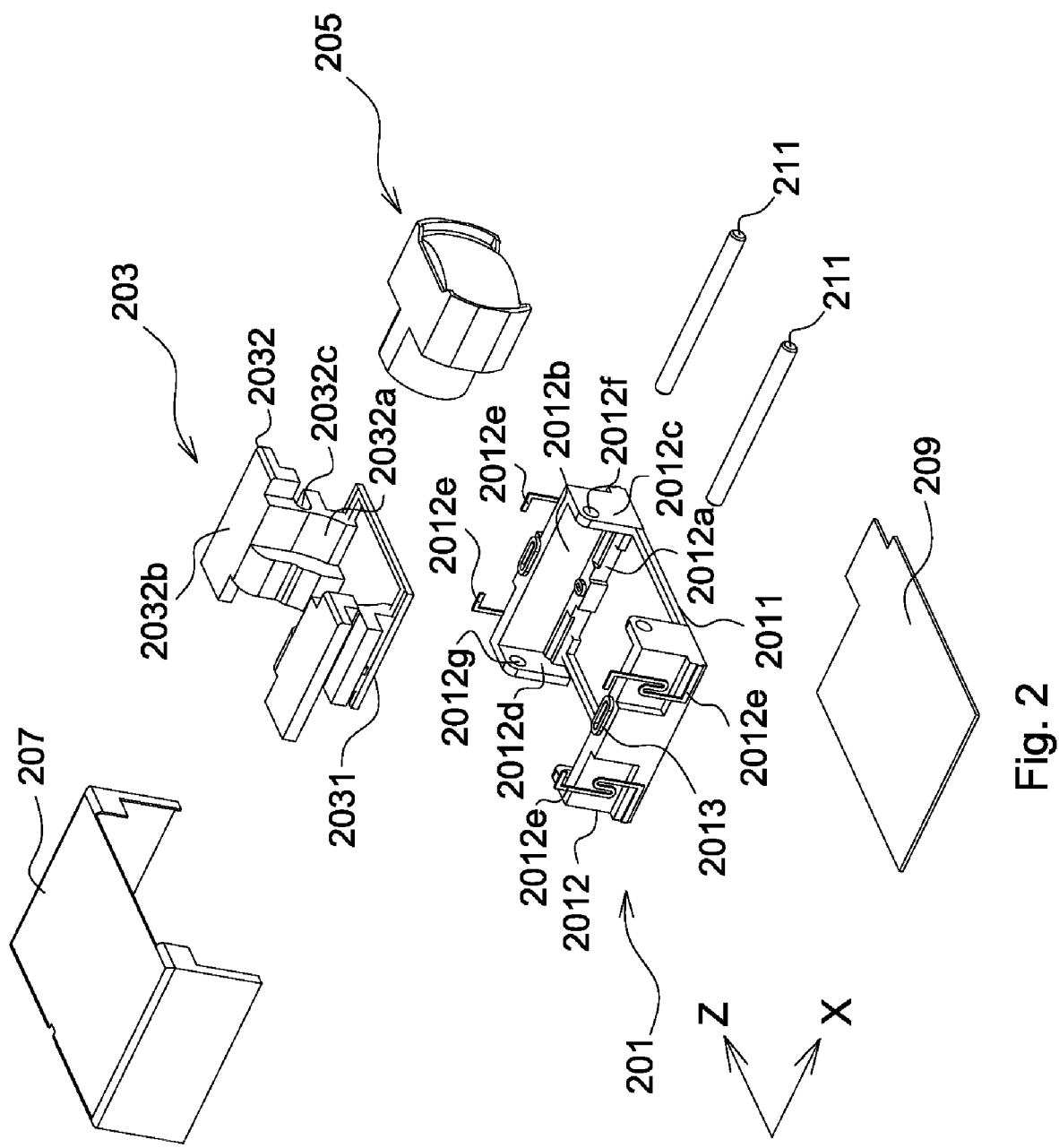
FIG. 2 is an exploded view of the lens driving module and the lens driving cover of FIG. 1.

Referring to FIGS. 1 and 2, a camera device (not shown) in accordance with a first embodiment of the invention includes an imaging unit (not shown), an optical turning module (not shown), an optical turning cover (not shown), a lens driving module 200, a lens driving cover 207 and two connecting units 211. The optical turning module is connected to the lens driving module 200 through the connecting units 211. The imaging unit may be a CCD (charge-coupled device) or CMOS (complementary metal oxide semiconductor) and is configured to receive light entering the camera device for obtaining an image.

The lens driving module 200 includes a second fixing element 201, a second carrier 203, a lens unit 205, two drivers (not shown) and a flexible printed circuit (FPC) board 209. The lens unit 205 includes a plurality of lenses (not shown), an aperture (not shown) and a lens barrel (not shown). The lenses are fixed in the lens barrel and constitute an optical axis (not shown). The lenses and the aperture are arranged along the optical axis, and the aperture is disposed in front of, between or at rear of the lenses. The lens unit 205 is firmly carried by the second carrier 203, and the second carrier 203 is movably connected to the second fixing element 201. When the second carrier 203 is moved with respect to the second fixing element 201 in a first direction X and a second direction Z (as shown in FIG. 9), the lens unit 205 is also moved with respect to the second fixing element 201 in the first direction X and the second direction Z. The first direction X is perpendicular to the second direction Z. In the first embodiment, the first direction X is front-to-back direction, and the second direction Z is side-to-side direction.

Figure 3:
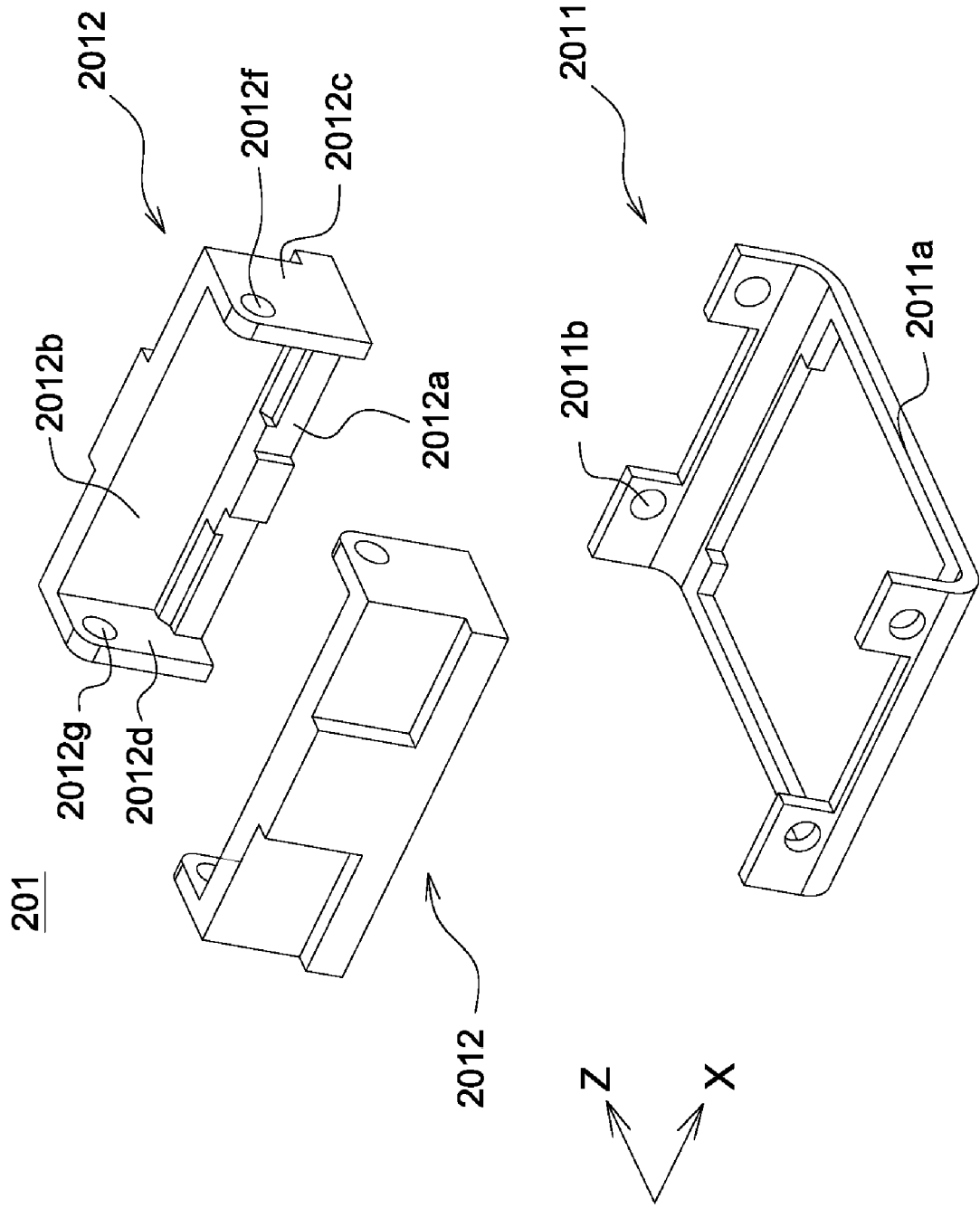
FIG. 3 is a schematic view of a second fixing element of FIG. 2.

Referring to FIGS. 2 and 3, the second fixing element 201 includes a second fixing base 2011 and two second fixing bodies 2012, wherein the second fixing bodies 2012 are connected to the second fixing base 2011 with respect to each other. The second fixing base 2011 includes a first frame portion 2011a and a plurality of first connecting portions 2011b, wherein the first connecting portions 2011b extend upwards from two sides of the first frame portion 2011a. The first frame portion 2011a is substantially a square frame and has an opening. Each side of the first frame portion 2011a is provided with at least one first connecting portion 2011b. Each of the first connecting portions 2011b is configured to be connected to the second fixing bodies 2012 and is provided with a hole.

Each of the second fixing bodies 2012 includes a main body 2012a, a lateral plate 2012b, a frontal plate 2012c, a back plate 2012d and two clamping portions 2012e. The lateral plate 2012b extends upwards from the main body 2012a. The frontal plate 2012c and the back plate 2012d respectively extend from two ends of the main body 2012a and the lateral plate 2012b towards another second fixing body 2012 in the second direction Z. The clamping portions 2012e extend upwards from the main body 2012a and are spaced from the lateral plate 2012b. Two main bodies 2012a of the second fixing bodies 2012 extend in the first direction X (that is, the front-to-back direction) and are respectively connected to the first connecting portions 2011b extending upwards from two sides of the second fixing base 2011. The frontal plate 2012c is provided with a hole 2012f, and the back plate 2012d is provided with a hole 2012g corresponding to the hole 2012f. The clamping portions 2012e extend from the main body 2012a towards the second carrier 203 and are connected to the second carrier 203. Thus, the second carrier 203 is hung and movable in the second fixing element 201. In the first embodiment, each of the clamping portions 2012e is elongated and has a meandering portion so as to be flexible. Therefore, the second carrier 203 can be moved in the first direction X and the second direction Z. In other words, the second carrier 203 carrying the lens unit 205 is movably disposed on the second fixing element 201 through the clamping portions 2012e.

The second fixing base 2011 is preferably made of a metal or an alloy, has high strength and is formed by stamping. Each of the second fixing bodies 2012 is plastic element. The second fixing base 2011 and the second fixing bodies 2012 are connected as one piece by insert molding. The second fixing bodies 2012 are firmly connected to the first connecting portions 2011b with the help of the hole of the first connecting portion 2011b. Since the second fixing base 2011 is made of metal (or alloy) rather than plastic, the second fixing base 2011 can be thinner and can have higher strength. In the first embodiment, a thickness of the first frame portion 2011a of the second fixing base 2011 ranges from 0.4 mm to 0.44 mm. Preferably, the thickness of the first frame portion 2011a of the second fixing base 2011 is 0.42 mm.

Figure 4:
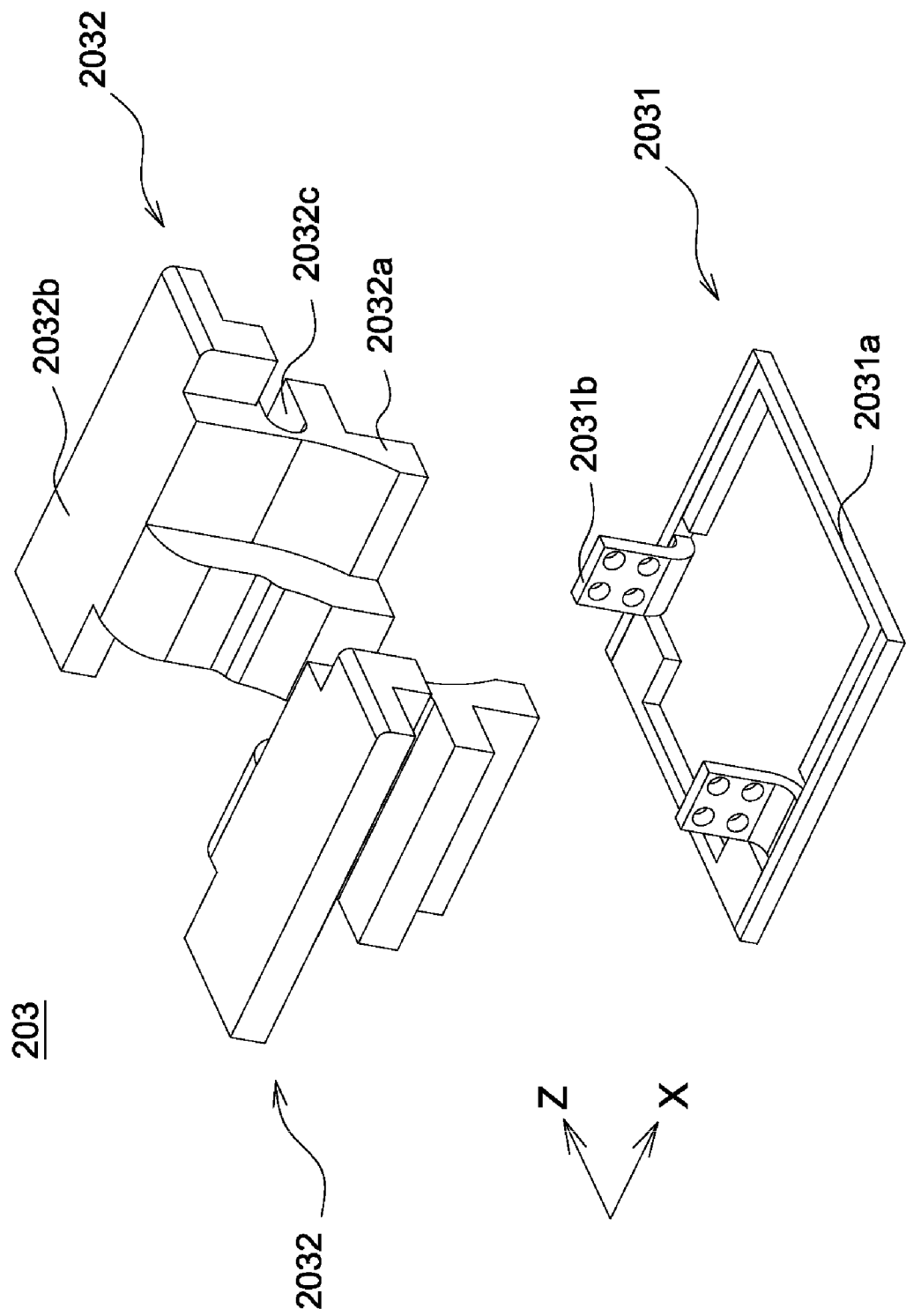
FIG. 4 is a schematic view of a second carrier of FIG. 2.

Referring to FIGS. 2 and 4, the second carrier 203 includes a second carrier base 2031 and two second carrier bodies 2032, wherein the second carrier bodies 2032 are connected to two sides of the second carrier base 2031 and opposite to each other. The second carrier base 2031 is configured to connect the second carrier bodies 2032 so that the second carrier base 2031 and the second carrier bodies 2032 are connected. The second carrier base 2031 and the second carrier bodies 2032 are arranged around the lens unit 205 and have a center coinciding with the optical axis of the lens unit 205 to form a partial outer circumferential structure of the lens unit 205. The second carrier base 2031 includes a second frame portion 2031a and two second connecting portions 2031b, wherein the second connecting portions 2031b extend upwards from two sides of the second frame portion 2031a respectively. The second frame portion 2031a is substantially a square frame. It is worth noting that an external size of the second frame portion 2031a is smaller than an internal size of the first frame portion 2011a of the second fixing base 2011 (that is, the opening of the first frame portion 2011a of the second fixing base 2011 is greater than the second carrier base 2031). Therefore, the second frame portion 2031a can be accommodated in the first frame portion 2011a and can be moved with respect to the first frame portion 2011a in the first direction X and the second direction Z. Each side of the second frame portion 2031a is provided with at least one second connecting portion 2031b. Each of the second connecting portions 2031b is configured to be connected to the second carrier bodies 2032 and is provided with holes. The second carrier 203 has an opening portion (not shown) formed on an end face of the second carrier 203 parallel and opposite to the second carrier base 2031. The lens unit 205 is disposed in the opening portion of the second carrier 203, and an end face of the lens unit 205 facing the lens driving cover 207 is exposed from the opening portion and is not protruded from the opening portion.

Each of the second carrier bodies 2032 includes a lens unit connecting portion 2032a and a fixing element connecting portion 2032b. A bottom end of the lens unit connecting portion 2032a is connected to the second carrier base 2031, and the fixing element connecting portion 2032b extends from a top end of the lens unit connecting portion 2032a in the second direction Z. The fixing element connecting portions 2032b of the second carrier bodies 2032 extend in opposite direction with respect to each other. The lens unit connecting portion 2032a extends upwards and obliquely and has an inner surface and an outer surface opposite to the inner surface. Two inner surfaces of two lens unit connecting portions 2032a are opposite to each other and fit outer surfaces of the lens unit 205 in shape so as to firmly clamp the lens unit 205. The lens unit 205 has a cross section where a virtual plane intersects the lens unit 205, wherein the virtual plane passes through the connecting units 211 and is parallel to the first direction X and the second direction Z. In this embodiment, an area of the cross section is greater than 50 percent of an internal area of the second frame portion 2031a and is smaller than 97 percent of the internal area of the second frame portion 2031a. Such a range improves the camera device to have better pixel, better incoming light amount, better resolution, minimized volume and better driving performance. The outer surface of the lens unit connecting portion 2032a is provided with two long cuts 2032c extending in the first direction X. The long cuts 2032c have a characteristic U shape (but not limited thereto), with straight sides and a rounded bottom when respectively rotated through 90 degrees and −90 degrees.

The second carrier base 2031 is preferably made of metal or alloy, which has high strength and can be shaped by stamping. Each of the second carrier bodies 2032 is plastic element and has a length parallel to the first direction X. The length is smaller than a distance between the frontal plate 2012c and the back plate 2012d of the second fixing body 2012. The second carrier base 2031 and the second carrier bodies 2032 are connected as one piece by insert molding. The second carrier bodies 2032 are firmly connected to the second connecting portions 2031b with the help of the holes of the second connecting portion 2031b. Since the second carrier base 2031 is made of metal (or alloy) rather than plastic, the second carrier base 2031 can be thinner and can have higher strength. In the first embodiment, a thickness of the second frame portion 2031a of the second carrier base 2031 is smaller than the thickness of the first frame portion 2011a of the second fixing base 2011, ranges from 0.3 mm to 0.35 mm and is preferably 0.32 mm.

A lateral surface of the fixing element connecting portion 2032b extends in the second direction Z and is aligned with a lateral surface of the main body 2012a of the second fixing element 201. Each of the clamping portions 2012e has a first end and a second end, wherein the first end is fixed to the main body 2012a, and the second end is connected to the fixing element connecting portion 2032b so that the second carrier 203 is connected to the second fixing element 201.

Each of the connecting units 211 sequentially passes through the hole 2012f of the frontal plate 2012c, the long cut 2032c of the second carrier body 2032 and the hole 2012g of the back plate 2012d. The long cut 2032c is configured to move with respect to the connecting unit 211 in the first direction X and the second direction Z so that the second carrier 203 is movable with respect to the second fixing element 201. A movement range of the second carrier 203 in the first direction X is constrained as one of the second carrier bodies 2032 is placed against the frontal plate 2012c or the back plate 2012d of the second fixing element 201. Another movement range of the second carrier 203 in the second direction Z is constrained as one of the second carrier bodies 2032 is placed against the lateral plate 2012b of the second fixing element 201 or the connecting unit 211. The connecting unit 211 is able to extend outside the second fixing element 201 for connecting to other modules (e.g. the optical turning module).

It is worth noting that the optical elements (e.g. the lens driving module) disposed within the camera device are not necessarily arranged along a central axis of the imaging unit because of the optical turning module. Therefore, the thickness of the camera device can be reduced and less space is occupied by the camera device. By providing the connecting units 211, the holes 2012f, the holes 2012g and the long cuts 2032c, the camera device of the invention can avoid complicated adjustment during assembly, increase efficiency of assembly and reduce cost. Besides, the structural strength of the camera device is significantly enhanced and the quality assurance of the camera device can be achieved due to the use of the connecting units 211 rather than glue.

Person having ordinary skill in the art would understand that the connecting units 211 are not necessary. That is, the connecting units 211, the holes 2012f, the holes 2012g and the long cuts 2032c can be omitted.

Figure 5:
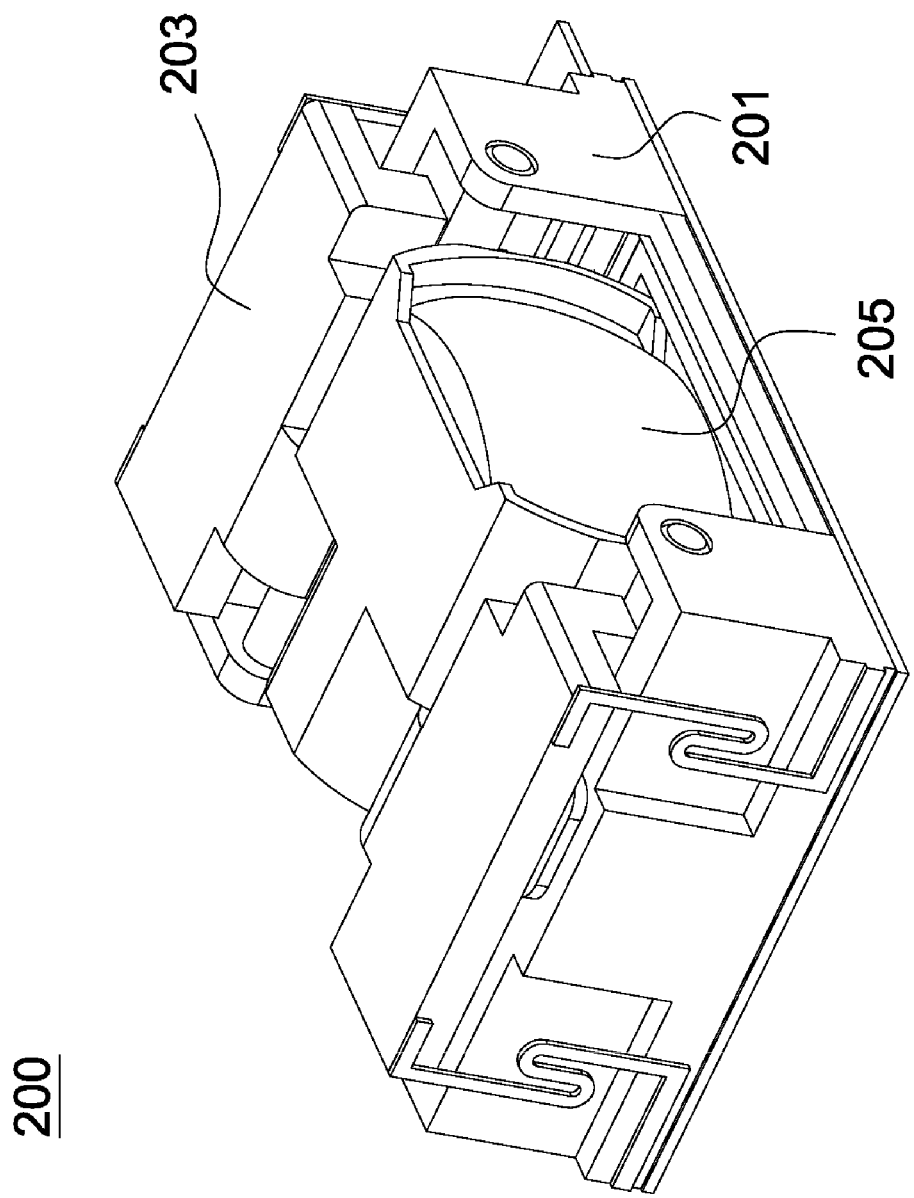
FIG. 5 is a schematic view of the assembled lens driving module of FIG. 2.
Figure 6:
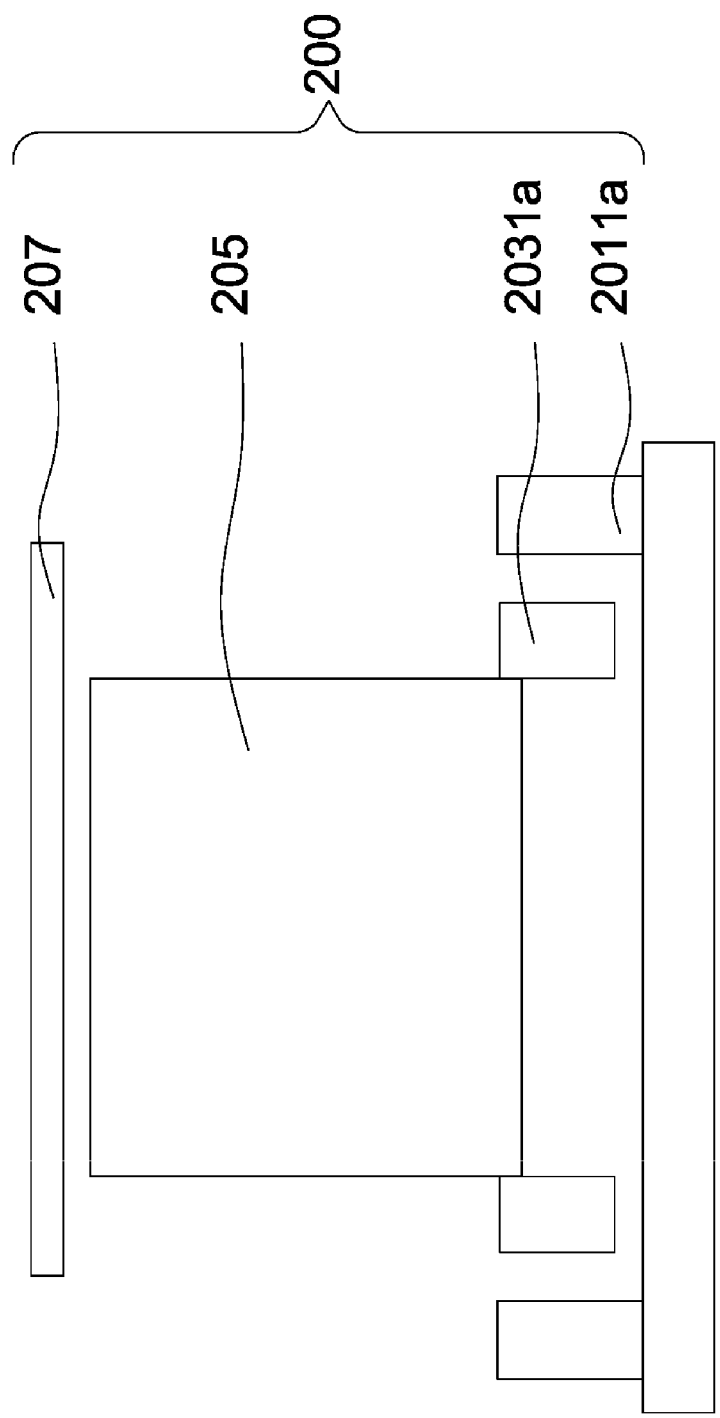
FIG. 6 is a sectional view the lens driving module and the lens driving cover of FIG. 1.

Referring to FIGS. 5 and 6, when the lens unit 205 is fixed to the second carrier 203 as well as the second carrier 203 is connected to the second fixing element 201, the second frame portion 2031a of the second carrier 203 is disposed in the first frame portion 2011a as well as a bottom of the lens unit 205 is disposed in the second frame portion 2031a. That is, the second frame portion 2031a of the second carrier 203 overlaps the first frame portion 2011a, and the bottom of the lens unit 205 overlaps the second frame portion 2031a. By such arrangement, the thickness of the camera device is significantly reduced.

As shown in FIG. 2, each of the drivers includes a coil 2013 and a magnet (not shown). It is worth noting that the magnet is disposed on the second carrier 203 when the coil 2013 is disposed on the second fixing element 201, and the coil 2013 is disposed on the second carrier 203 when the magnet is disposed on the second fixing element 201. When current flows through the coil 2013, an electromagnetic field is generated between the second fixing element 201 and the second carrier 203, thereby driving the second carrier 203 to move with respect to the second fixing element 201 in the first direction X and the second direction Z for adjusting the lens unit 205. In the first embodiment, the coil 2013 is disposed on the second fixing element 201, and the magnet is disposed on the second carrier 203.

When the second carrier 203 is moved with respect to the second fixing element 201, the clamping portions 2012e are capable of supporting the second carrier 203 and providing a restoring force for the second carrier 203 to return after moving away.

The flexible printed circuit board 209 covers a bottom of the second fixing element 201, is electrically connected to the coil 2013 and is configured to seal the first frame portion 2011a so as to protect the camera device from dust. As compared to conventional skill, the invention is able to omit a bottom cover of the lens driving module 200, thereby reducing the height of the camera device.

During the operation of an image capturing apparatus provided with the camera device, the camera device is configured to receive a light beam (not shown) emitted by an object. After the light beam enters the camera device, an optical path of the light beam is adjusted by the optical turning module, and the light beam passes through the lens unit 205 and enters the imaging unit, so that the imaging unit obtains an image of the object. The second carrier 203 forces the lens unit 205 to move with respect to the second fixing element 201 in the first direction X and the second direction Z through the clamping portions 2012e, so that the light beam can pass through the lens unit 205 in a way that the light beam is parallel to the optical axis of the lens unit 205. Therefore, the image capturing apparatus provided with the camera device achieves "OIS (optical image stabilization)" and "AF (auto focus)" functions.

Figure 7:
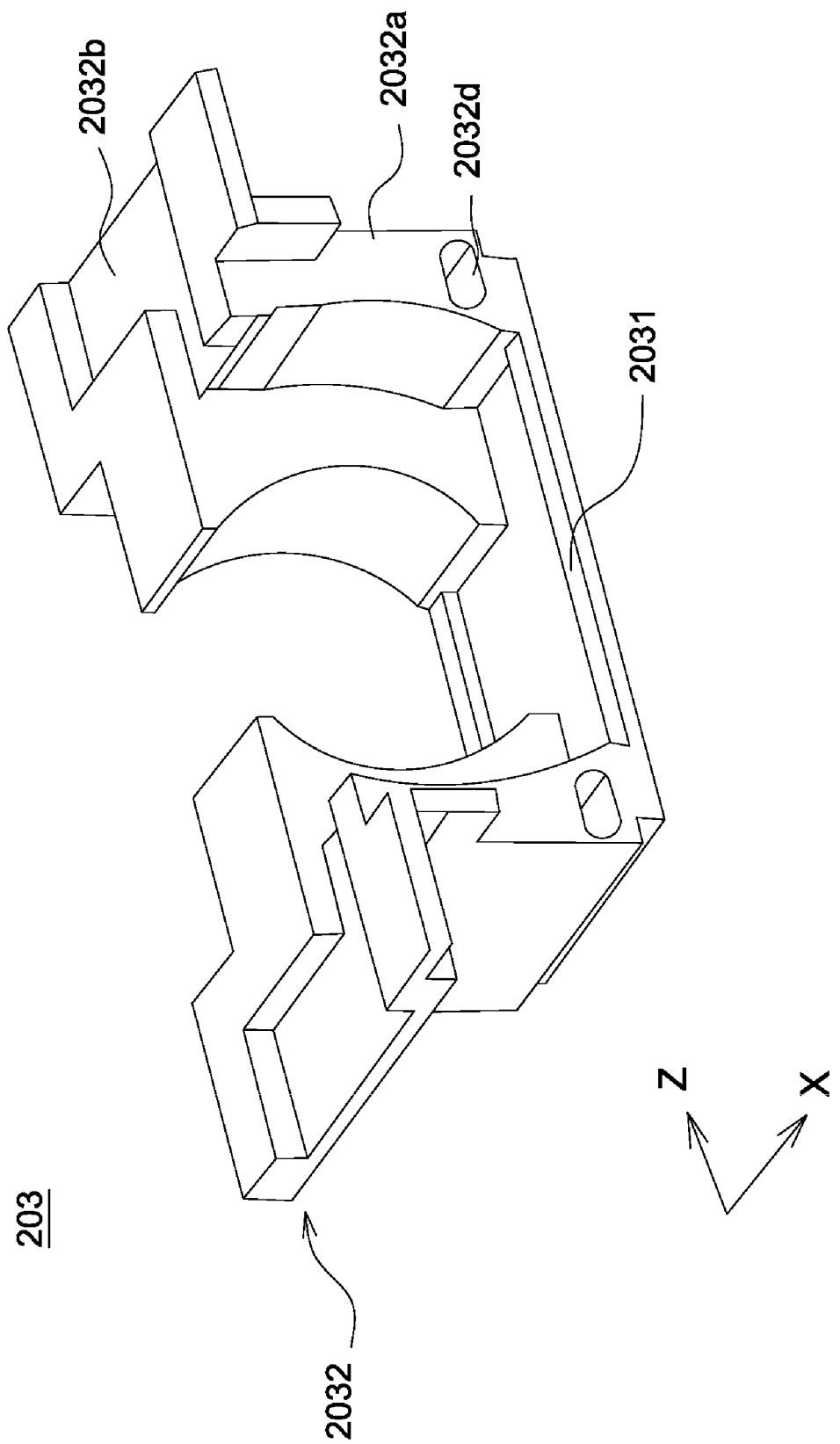
FIG. 7 is a schematic view of a second carrier of a camera device in accordance with another embodiment of the invention.

In another embodiment, the outer surface of the lens unit connecting portion 2032a is not provided with the long cut 2032c, Referring to FIG. 7, instead, the ouster surface of the lens unit connecting portion 2032a is provided with a through hole 2032d extending and penetrating through the lens unit connecting portion 2032a in the first direction X.

Similarly, each of the connecting units 211 sequentially passes through the hole 2012f of the frontal plate 2012c, the through hole 2032d of the second carrier body 2032 and the hole 2012g of the back plate 2012d. The through hole 2032d is configured to move with respect to the connecting unit 211 in the first direction X and the second direction Z so that the second carrier 203 is movable with respect to the second fixing element 201. A movement range of the second carrier 203 in the first direction X is constrained as one of the second carrier bodies 2032 is placed against the frontal plate 2012c or the back plate 2012d of the second fixing element 201. Another movement range of the second carrier 203 in the second direction Z is constrained as the through hole 2032d of the second carrier bodies 2032 is placed against the connecting unit 211. Person having ordinary skill in the art would understand that the connecting units 211 are not necessary. That is, the connecting units 211, the holes 2012f, the holes 2012g and the through holes 2032d can be omitted. The arrangement of other elements and operation are similar to those of the above embodiment, and therefore the descriptions thereof are omitted.

Figure 8:
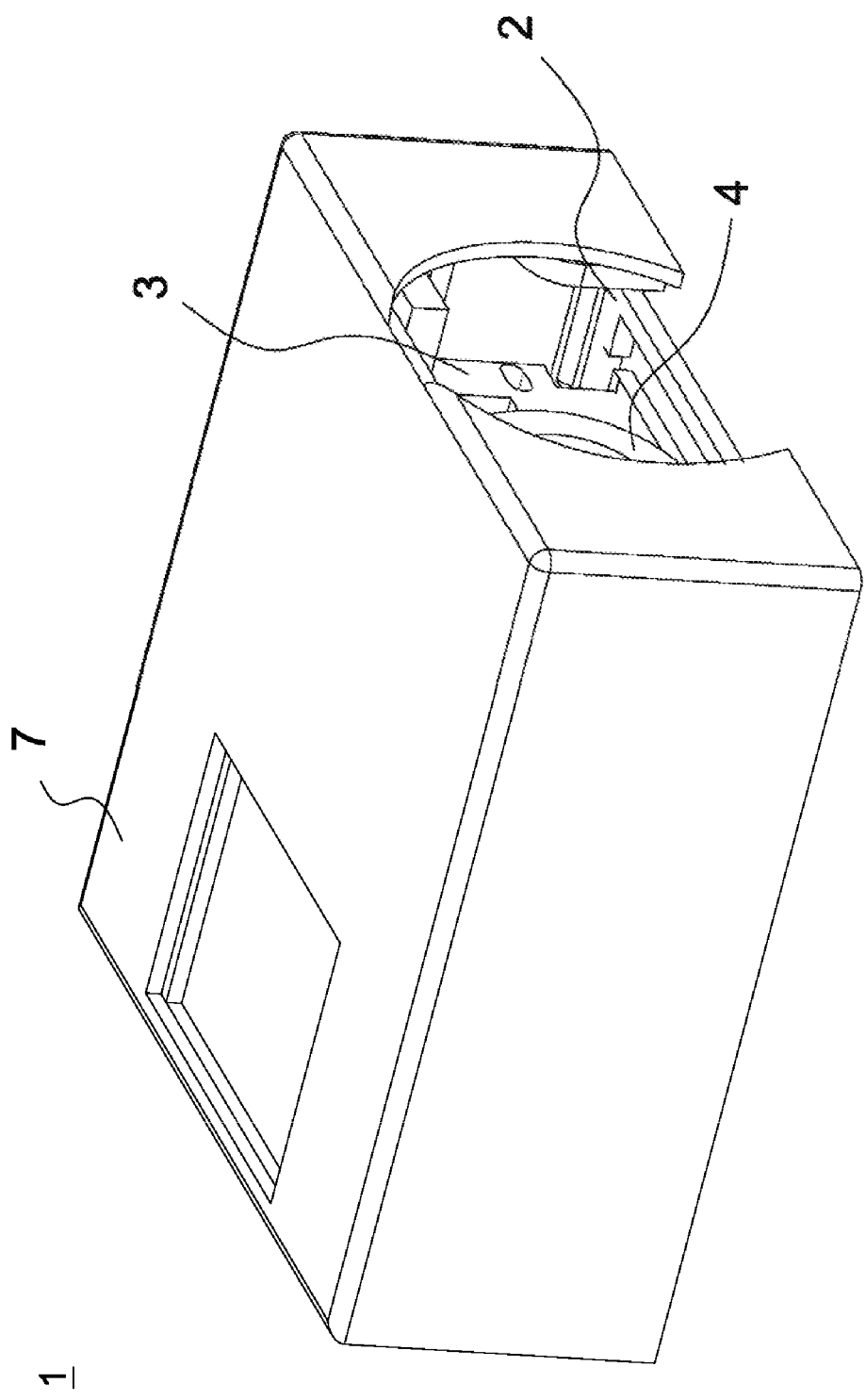
FIG. 8 is a schematic view of a camera device in accordance with a second embodiment of the invention.
Figure 9A:
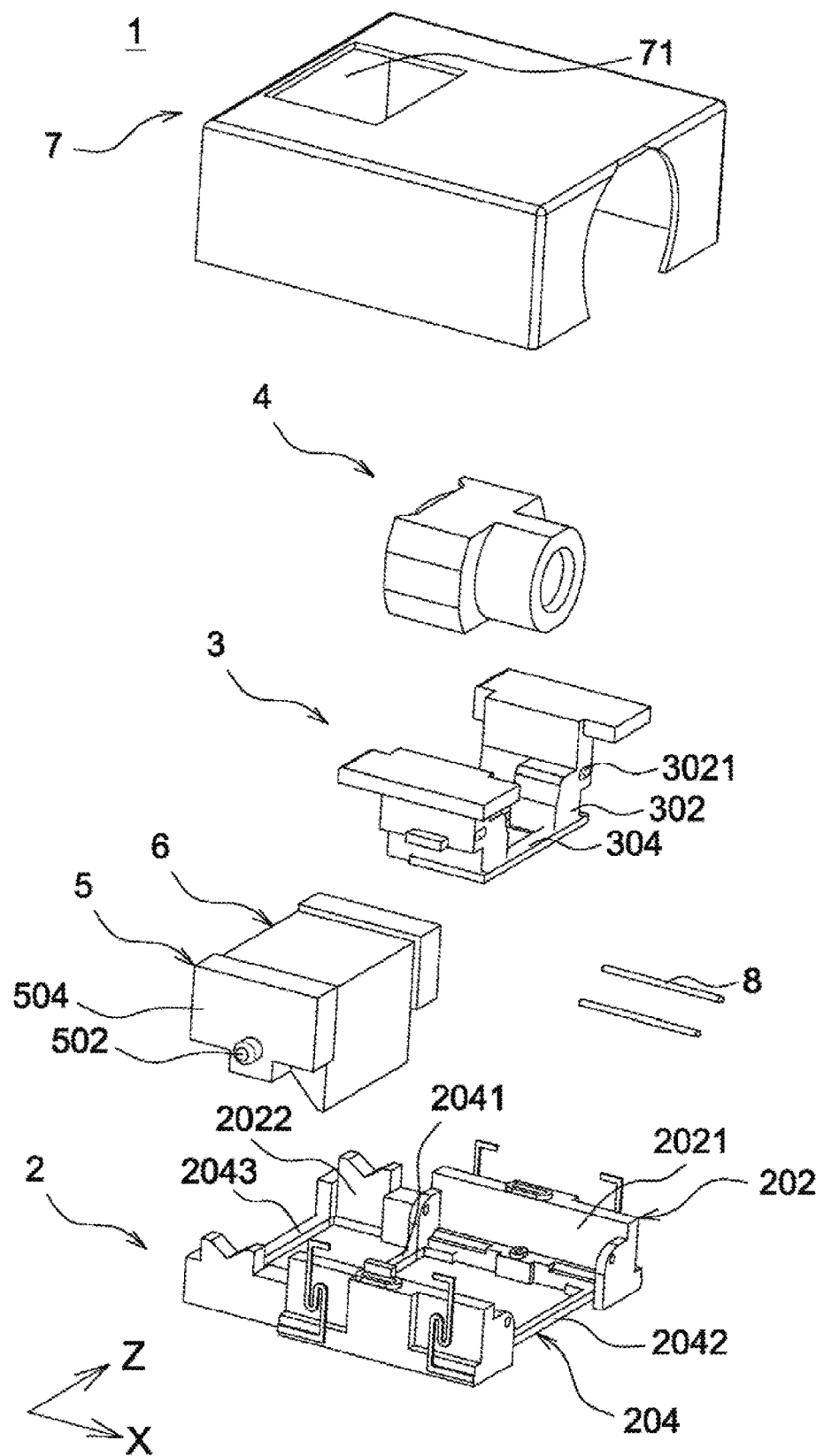
FIG. 9A is an exploded view of the camera device of FIG. 8.
Figure 9B:
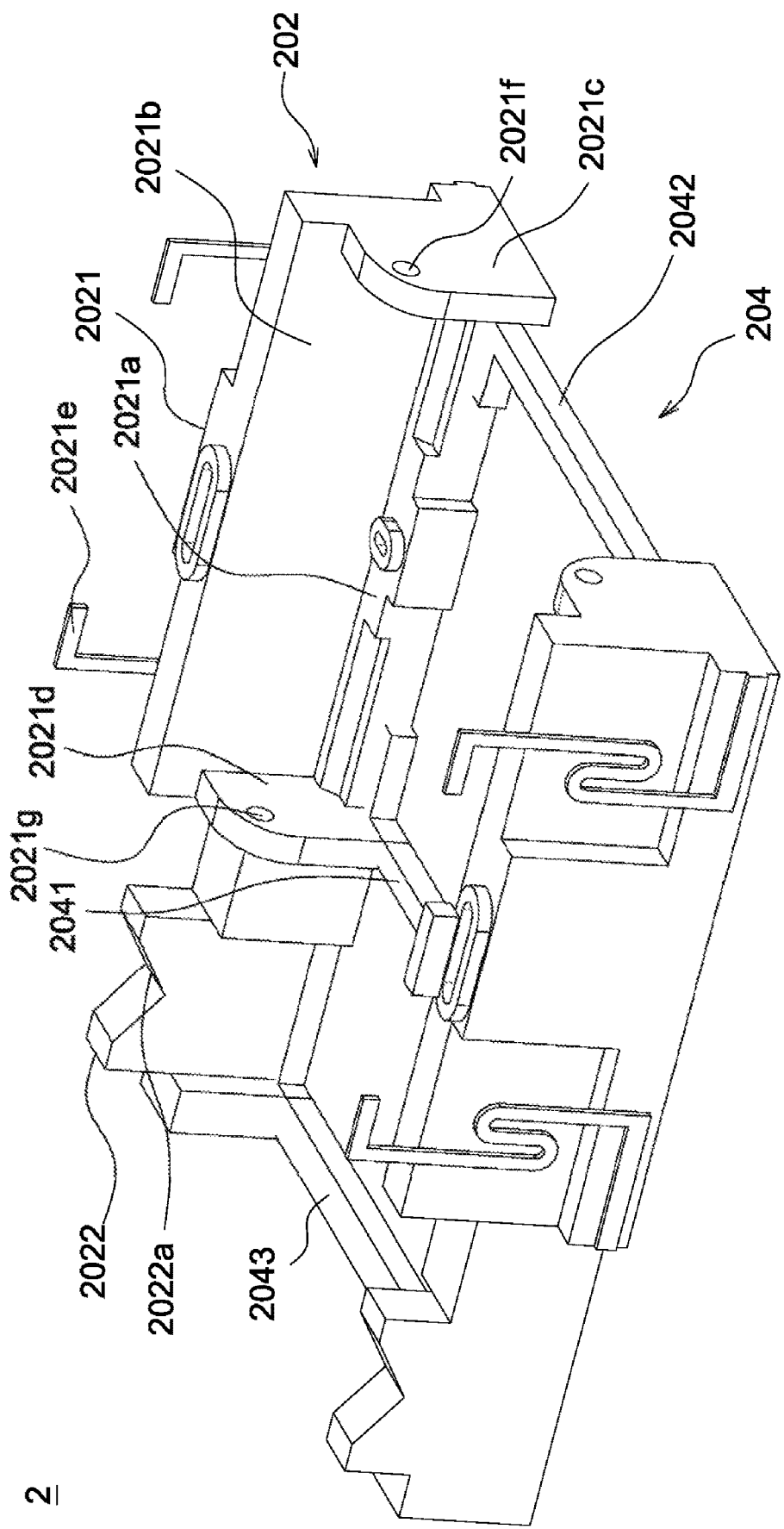
FIG. 9B is a schematic view of a fixing element of FIG. 9A.

Referring to FIGS. 8, 9A and 9B, a camera device 1 in accordance with a second embodiment of the invention includes an imaging unit (not shown), a fixing element 2, a second carrier 3, a lens unit 4, a first carrier 5, an optical turning unit 6, a cover 7 and two connecting units 8. The second embodiment differs from the above embodiments in that the fixing element 2 is provided for carrying both the optical turning module and the lens driving module commonly.

The fixing element 2 has a frontal portion and a rear portion. The second carrier 3 is connected to the frontal portion of the fixing element 2, and the lens unit 4 is firmly disposed in the second carrier 3. The first carrier 5 is disposed on the rear portion of the fixing element 2, and the optical turning unit 6 is fixed in the first carrier 5. The cover 7 covers a top of the second carrier 3 and two sides of the fixing element 2. It is worth noting that the cover 7 is provided with a light transmitting opening 71 corresponding to the optical turning unit 6 for allowing light to pass through.

The lens unit 4 includes a plurality of lenses (not shown), an aperture (not shown) and a lens barrel (not shown). The lenses are fixed in the lens barrel and constitute an optical axis (not shown). The lenses and the aperture are arranged along the optical axis, and the aperture is disposed in front of, between or at rear of the lenses. The lens unit 4 is firmly carried by the second carrier 3, and the second carrier 3 is movably connected to the fixing element 2. When the second carrier 3 is moved with respect to the fixing element 2 in a first direction X and a second direction Z (as shown in FIG. 9), the lens unit 4 is also moved with respect to the fixing element 2 in the first direction X and the second direction Z. The first direction X is perpendicular to the second direction Z. In the second embodiment, the first direction X is front-to-back direction parallel to the optical axis, and the second direction Z is side-to-side direction perpendicular to the optical axis.

Figure 10:
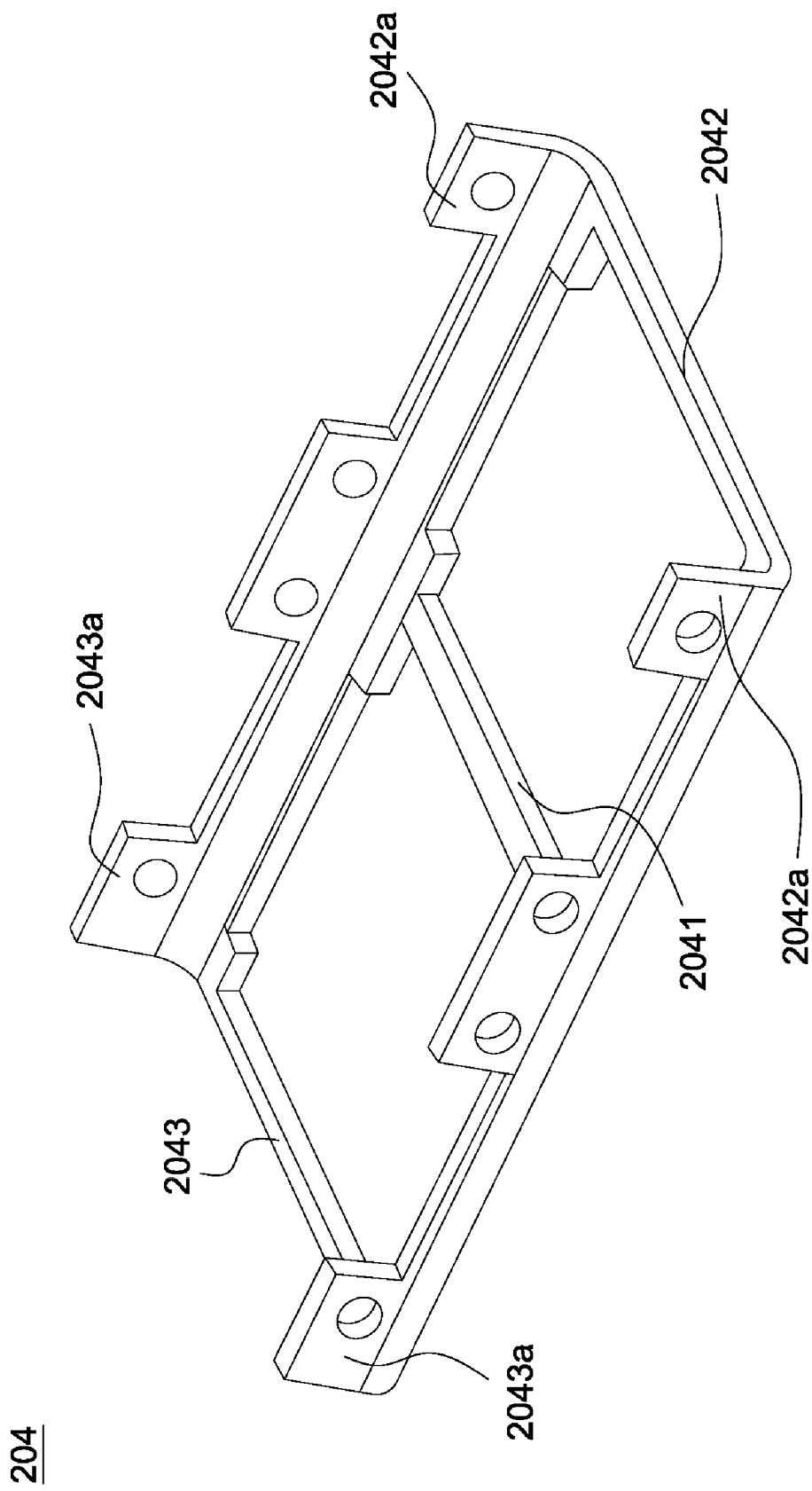
FIG. 10 is a schematic view of a fixing base of FIG. 9A.
Figure 11:
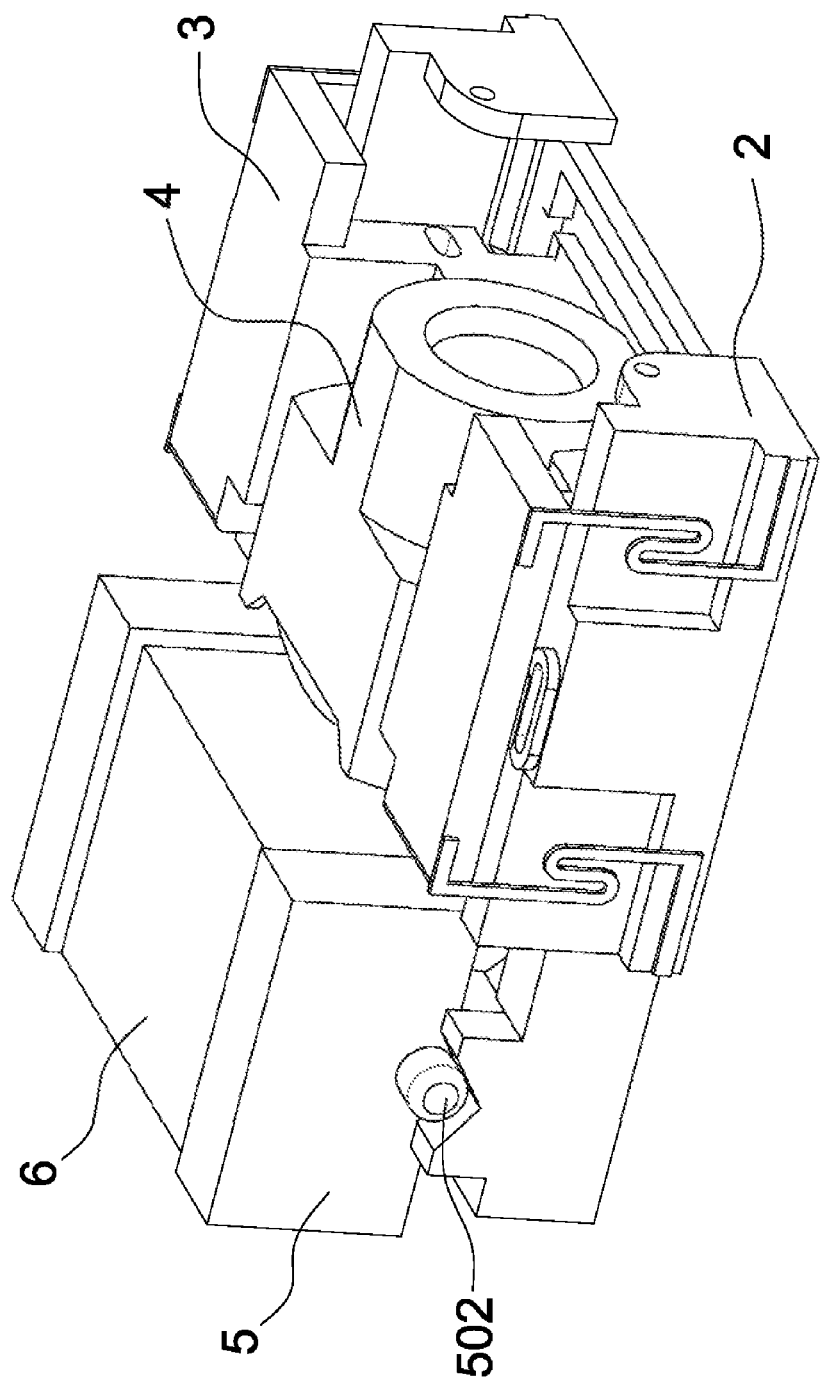
FIG. 11 is a schematic view of the camera device from which a cover is removed of FIG. 8.

Referring to FIGS. 8-10, the fixing element 2 includes a fixing base 204 and a fixing body 202, wherein the fixing body 202 is firmly connected to the fixing base 204. The fixing base 204 is preferably made of metal or alloy, which has high strength and can be shaped by stamping. In the second embodiment, the fixing base 204 is substantially a rectangular frame and includes a spacing portion 2041, a second frame portion 2042, a plurality of second connecting portions 2042a, a first frame portion 2043 and a plurality of first connecting portions 2043a. The fixing base 204 is divided into the first frame portion 2043 and the second frame portion 2042 through the spacing portion 2041. The second frame portion 2042 defines a frontal portion, the first frame portion 2043 defines a rear portion, and the second frame portion 2042 and the first frame portion 2043 are formed as one piece by stamping.

It is worth noting that the second frame portion 2042 is substantially a square frame and has an opening. Similarly, the first frame portion 2043 is substantially a square frame and has an opening. The second connecting portions 2042a extend upwards from two sides of the second frame portion 2042, and each of the second connecting portions 2042a is provided with a hole. The first connecting portions 2043a extend upwards from two sides of the first frame portion 2043, and each of the first connecting portions 2043a is provided with a hole. Person having ordinary skill in the art would understand that the second connecting portions 2042a and the first connecting portions 2043a are not necessary, and thereby the second connecting portions 2042a, the first connecting portions 2043a or the combination thereof can be omitted.

The fixing body 202 includes two second fixing portions 2021 and two first fixing portions 2022, wherein the second fixing portions 2021 are connected to the frontal portion of the fixing base 204, and the first fixing portions 2022 are connected to the rear portion of the fixing base 204. The fixing body 202 is preferably formed as one piece hut not limited thereto. The second fixing portions 2021 are firmly connected to the second frame portion 2042 and disposed opposite to each other, and the first fixing portions 2022 are firmly connected to the first frame portion 2043 and disposed opposite to each other. The second fixing portion 2021 and the first fixing portion 2022 are formed as one piece on the same side of the fixing base 204. The fixing body 202 is a plastic element and is connected to the fixing base 204 as one piece by insert molding.

Each of the second fixing portions 2021 includes a main body 2021a, a lateral plate 2021b, a frontal plate 2021c, a back plate 2021d and two clamping portions 2021e. The main body 2021a is connected to the fixing base 204. The lateral plate 2021b extends upwards from the main body 2021a. The frontal plate 2021c and the back plate 2021d respectively extend from two ends of the main body 2021a and the lateral plate 2021b towards another the second fixing portions 2022 in the second direction Z. The clamping portions 2021e extend upwards from the main body 2021a and are spaced from the lateral plate 2021b. The frontal plate 2021c is provided with a hole 2021f, and the back plate 2021d is provided with a hole 2021g corresponding to the hole 2021f. The clamping portions 2021e extend from the main body 2021a towards the second carrier 3 and are connected to the second carrier 3. Thus, the second carrier 3 is hung and movable between the second fixing portions 2021 of the fixing element 2.

The first fixing portions 2022 are connected to the fixing base 204 and extend upwards. Each of the first fixing portions 2022 has a top surface, and the top surface is provided with a gap 2022a. The gap 2022a is V-shaped, U-shaped or concave but not limited thereto.

The second carrier 3 includes a second carrier base 304 and two second carrier bodies 302, wherein the second carrier bodies 302 are connected to two sides of the second carrier base 304 and disposed opposite to each other. The second carrier base 304 is preferably made of metal or alloy, which has high strength and can be shaped by stamping. The second carrier base 304 is substantially a square frame and has an opening. An external size of the second carrier base 304 is smaller than an internal size of the second frame portion 2042 of the fixing base 204 (that is, the opening of the second frame portion 2042 of the fixing base 204 is greater than the second carrier base 304), so that the second carrier base 304 can be disposed in the second frame portion 2042 and can be moved with respect to the second frame portion 2042 in the first direction X and the second direction Z. A bottom of the lens unit 4 is disposed in the second carrier base 304.

The second carrier bodies 302 are plastic elements. The second carrier bodies 302 and the second carrier base 304 are formed as one piece by insert molding. The second carrier 3 is provided with a through hole 3021. In another embodiment, the through hole 3021 is omitted, and the second carrier 302 is provided with a long cut (not shown).

Each of the connecting units 8 sequentially passes through the hole 2021f of the frontal plate 2021c, the through hole 3021 of the second carrier body 302 and the hole 2021g of the back plate 2021d. The through hole 3021 is configured to move with respect to the connecting unit 8 in the first direction X and the second direction Z so that the second carrier 3 is movable with respect to the fixing element 2.

The camera device 1 further includes a driver (not shown configured to drive the second carrier 3 to move with respect to the second fixing portion 2021 of the fixing element 2 in the first direction X and the second direction Z. The driver is a combination of a coil, a position sensor and a magnet disposed with respect to the coil. In another embodiment, the driver is a VCM (voice-coil motor) or a piezoelectric material.

The optical turning unit 6 is fixed in the first carrier 5, and the first carrier 5 is disposed on the first fixing portions 2022 of the first element 2. In the second embodiment, the first carrier 5 is rotatably disposed on the first fixing portions 2022. The first carrier 5 includes two first carrier bodies 504 disposed opposite to each other and two rotating shafts 502. Each of the rotating shafts 502 extends from an outer surface of the first carrier body 504 and is rotatably disposed in the gap 2022a on the top surface of the first fixing portion 2022. In another embodiment, the first carrier 5 is fixed to the first fixing portions 2022 of the fixing element 2.

Since the fixing base 204 is made of metal or alloy rather than plastic, the fixing base 204 can be thinner and can have higher strength. Further, the fixing base 204 is formed as one piece, the second carrier 3 is connected to the frontal portion thereof, and the first carrier 5 is disposed on the rear portion thereof. Therefore, the strength of the camera device 1 is increased as well as the assembly time of the camera device 1 is reduced.

Referring to FIGS. 8-11, during the operation of an image capturing apparatus provided with the camera device 1, the camera device 1 receives a light beam (not shown) emitted by an object. The first carrier 5 rotates the optical turning unit 6 about an axis parallel to the second direction Z (or an axis perpendicular to the optical axis) with respect to the fixing element 2 through the rotating shafts 502, so as to adjust an angle of the optical turning unit 6 for receiving the light beam. The second carrier 3 moves the lens unit 4 in the first direction X and the second direction Z with respect to the fixing element 2, so that the light beam is able to pass through the lens unit 4 in a way that the light beam is parallel to the optical axis. Therefore, the image capturing apparatus provided with the camera device 1 achieves "OIS (optical image stabilization)" and "AF (auto focus)" functions.

Figure 12:
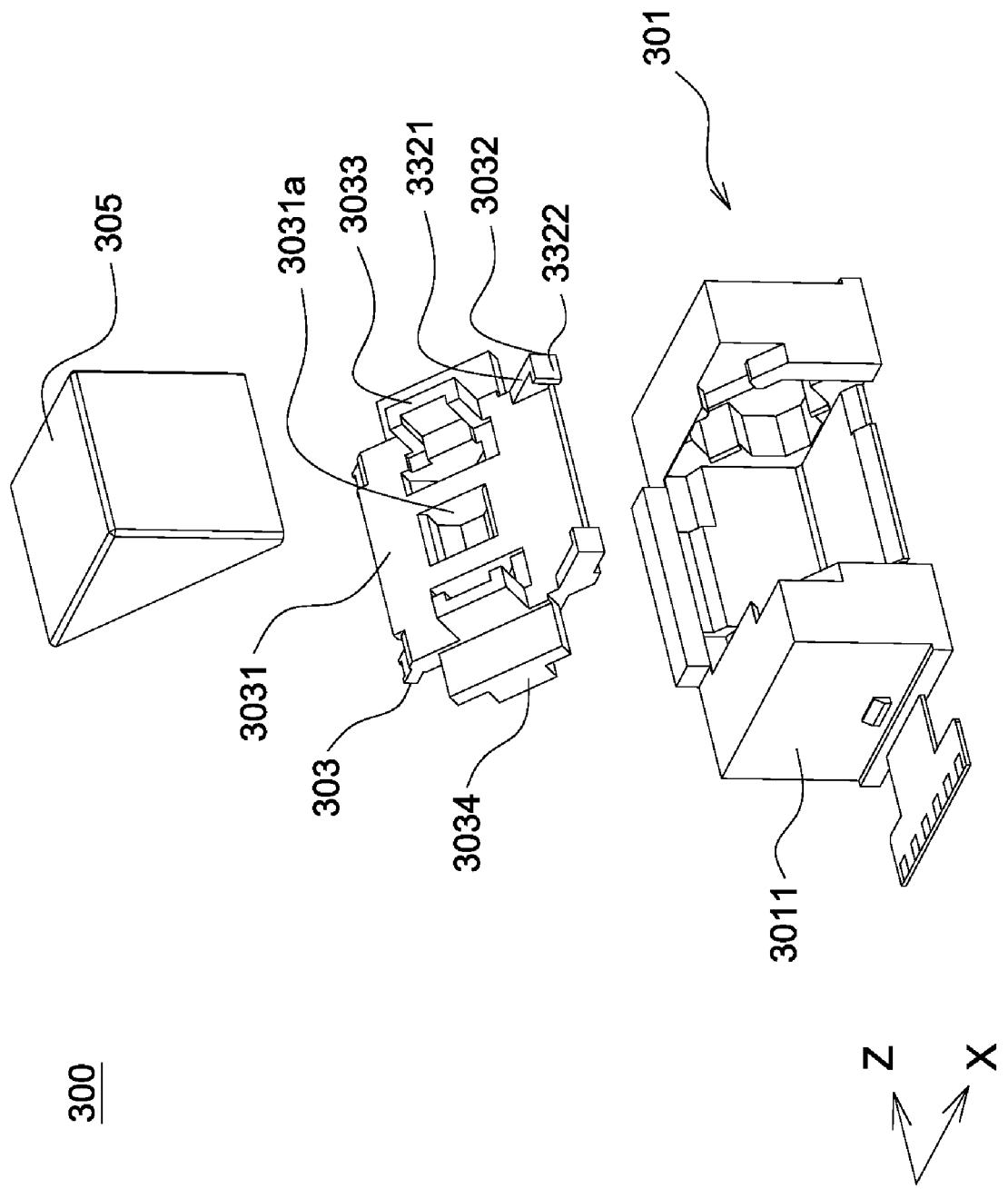
FIG. 12 is an exploded view of a camera device in accordance with a third embodiment of the invention.
Figure 13:
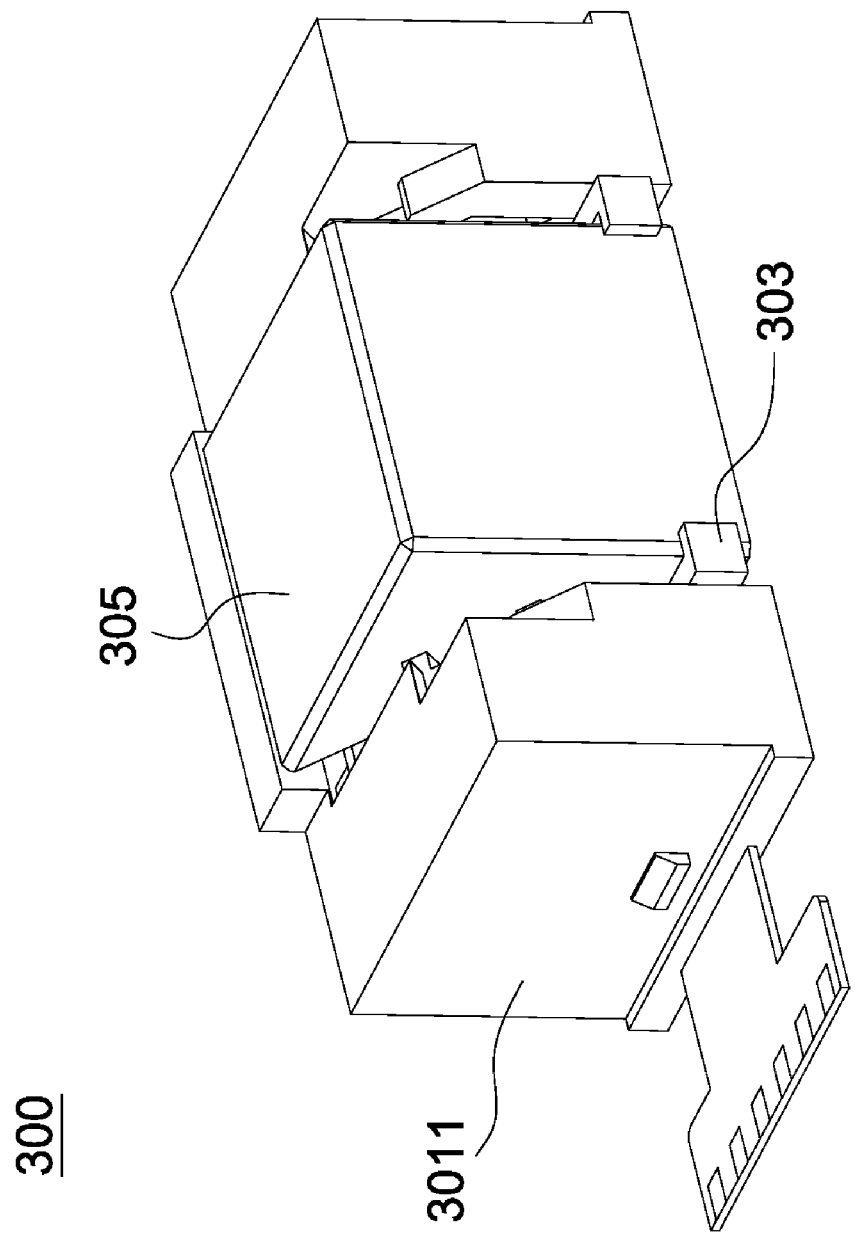
FIG. 13 is a schematic view of an assembled optical turning module of FIG. 12.

Referring to FIGS. 12 and 13, a camera device (not shown) in accordance with a third embodiment of the invention includes an imaging unit (not shown), an optical turning module 300, an optical turning cover (not shown), a lens driving module (not shown) and a lens driving cover (not shown). The difference between the third embodiment and the above embodiments is the structure of the optical turning module 300.

As shown in FIG. 12, the optical turning module 300 includes a first fixing element 301, a first carrier 303 and an optical turning unit 305. In the third embodiment, the lens driving module includes a plurality of lenses (not shown) which constitute an optical axis (not shown). The optical axis is parallel to a first direction X and is perpendicular to a second direction Z. The optical turning unit 305 is, for example, a prism, reflecting mirror, refracting mirror or polarizing mirror.

The optical turning unit 305 is fixed in the first carrier 303. The first carrier 303 includes a first carrier body 3031, two first limiting portions 3032, two second limiting portions 3033 and two locating portions 3034. The first carrier body 3031 is sloped with respect to the optical axis. The first limiting portions 3032 respectively extend forward from two sides of the first carrier body 3031 in a direction parallel to the optical axis (that is, the first direction X). The second limiting portions 3033 respectively extend obliquely and upwards from two sides of the first carrier body 3031. The locating portions 3034 respectively extend from two sides of the first carrier body 3031 in a direction perpendicular to the optical axis (that is, the second direction Z).

Each of the locating portions 3034 is T-shaped when being observed in the second direction Z and includes a supporting portion extending outwards from the first carrier body 3031 and a pivoting portion extending obliquely and downwards from a center of a bottom surface of the supporting portion. The supporting portion is parallel to the first carrier body 3031. Preferably, the supporting portion and the first carrier body 3031 are arranged on the same plane. The first fixing element 301 includes two lateral plates 3011 connected to each other, a back plate and a bottom plate. Each of the lateral plates 3011 is provided with a recess configured to accommodate the locating portion 3034 of the first carrier 303, and the recess has a space allowing rotation of the pivoting portion of the locating portion 3034. Each of the lateral plates 3011 is further provided with two third limiting portions which are disposed obliquely above the recess. When the first carrier 303 is disposed in the first fixing element 301, the third limiting portions are partially placed against a top surface of the second limiting portion 3033 so that the first carrier 3033 is not able to move upwards.

The first carrier body 3031 is provided with a light transmitting hole 3031a configured to allow light to pass through. The first carrier body 3031 is sloped at 45 degrees with respect to the optical axis. The second limiting portions 3033 clamp two sides of the optical turning unit 305 so that the optical turning unit 305 is not movable in the second direction Z. The second limiting portions 3033 are perpendicular to the first carrier body 3031. Each of the first limiting portions 3032 is curved (preferably L-shaped) and includes a first part 3321 and a second part 3322 perpendicular to the first part 3321. Two first parts 3321 of the first limiting portions 3032 clamp two sides of the optical turning unit 305, and two second parts 3322 of the first limiting portions 3032 are placed against a frontal surface of the optical turning unit 305. The optical turning unit 305 is constrained from moving in the first direction X by the first carrier body 3031 and the second parts 3322 of the first limiting portions 3032.

In the third embodiment the first limiting portions 3032 of the first carrier 303 are placed against the frontal surface of the optical turning unit 305, rather than placed against a bottom surface of the optical turning unit that is performed in the prior art. In the third embodiment, therefore, the height of the optical turning unit 305 and the thickness of the optical turning module 300 are reduced, and the requirements of the strength and miniaturization of the camera device are both met.

It is worth noting that the first carrier 303 of the third embodiment is disposed on an internal surface of the first fixing element 301 through the locating portions 3034, while the first carrier 5 of the second embodiment is disposed on the top surfaces of the first fixing portions 2022.

Figure 14:
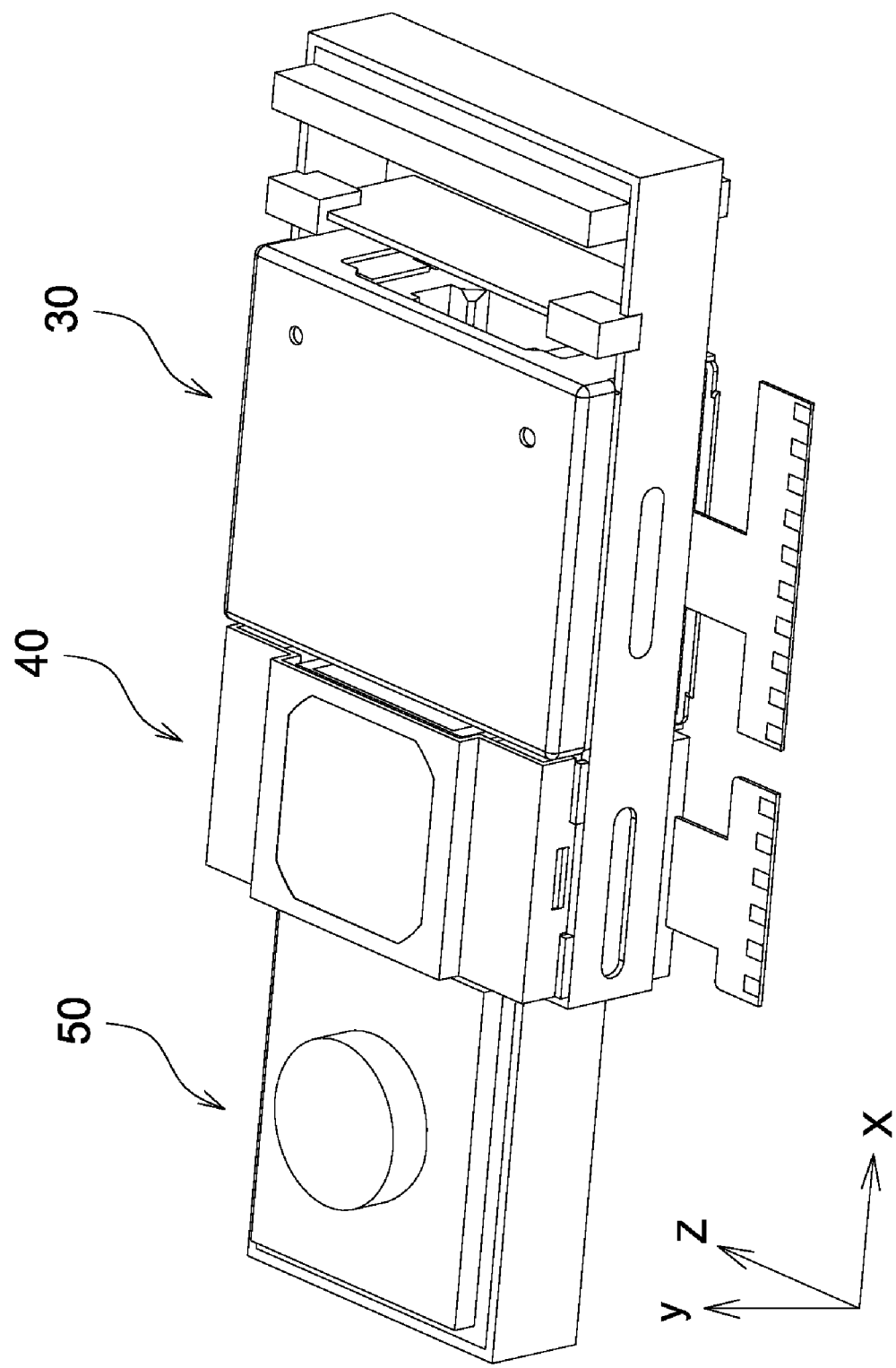
FIG. 14 is a schematic view of a camera device in accordance with a fourth embodiment of the invention.
Figure 15:
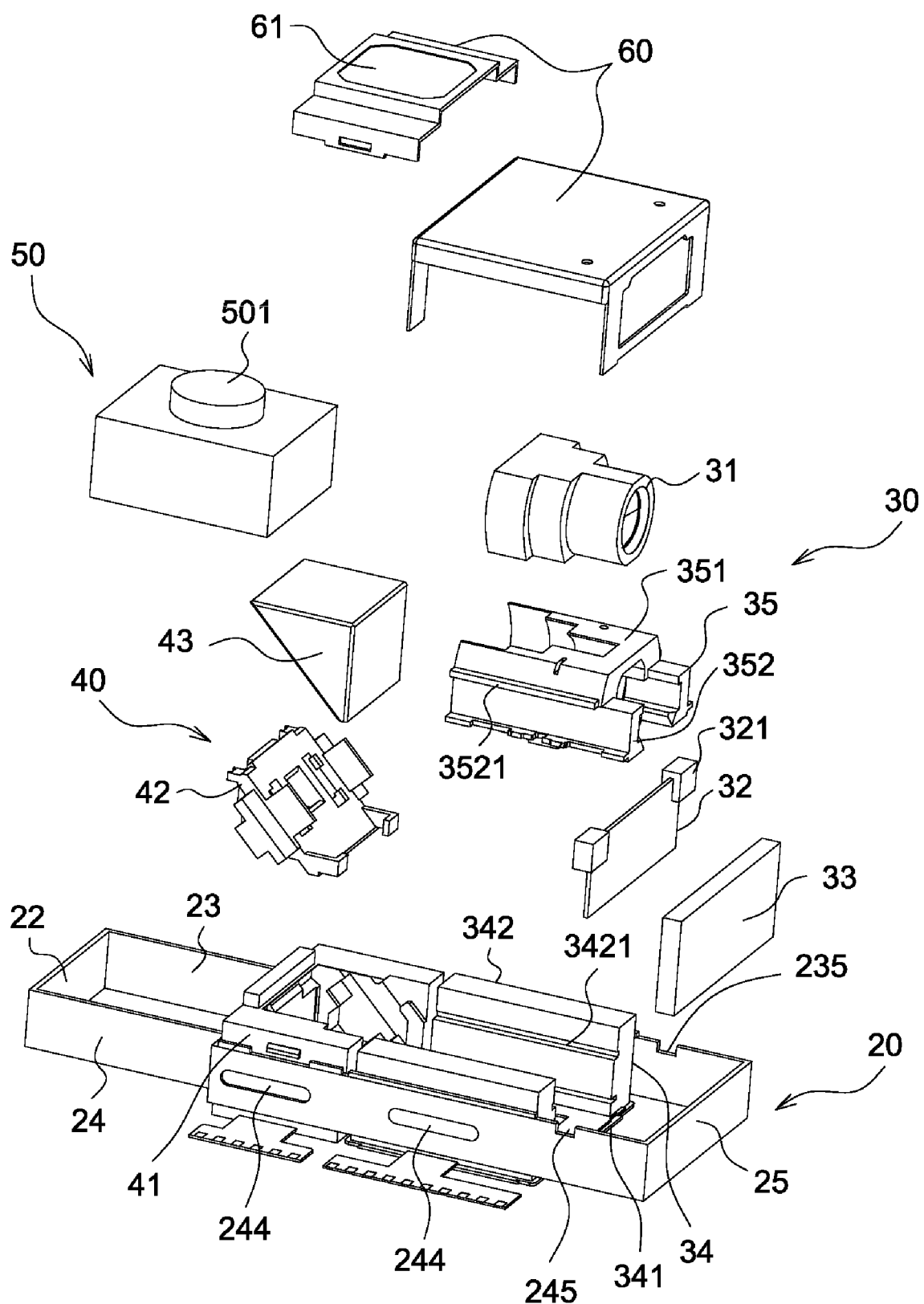
FIG. 15 is an exploded view of the camera device of FIG. 14.
Figure 17:
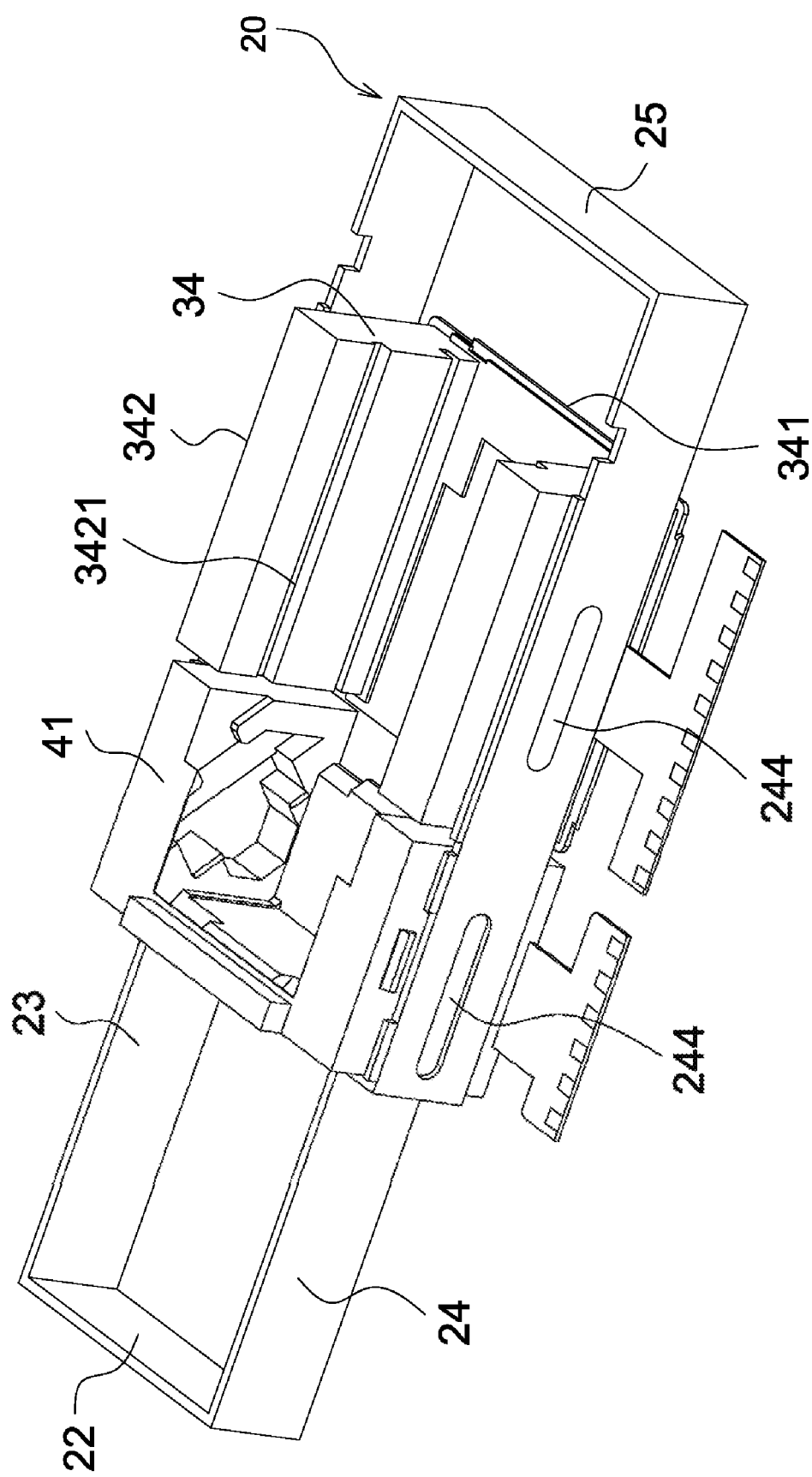
FIG. 17 is a schematic view of the frame body in which a first fixing element and a second fixing element are disposed of FIG. 15.

Referring to FIGS. 14, 15 and 17, a camera device (not shown) in accordance with a fourth embodiment of the invention includes an first imaging unit 33, a frame body 20, a first lens driving module 30, an optical turning module 40, a second lens driving module 50 and a cover 60. The fourth embodiment differs from the above embodiments in that the camera device of the fourth embodiment further includes the second lens driving module 50 and the frame body 20.

The frame body 20 has an accommodating space. The first imaging unit 33, the first lens driving module 30, the optical turning module 40 and the second lens driving module 50 are sequentially fixed in the accommodating space of the frame body 20. The first lens driving module 30 has a first optical axis (not shown) which is parallel to a first direction X as shown in FIG. 14. The second lens driving module 50 has a second optical axis (not shown) which is parallel to a third direction Y as shown in FIG. 14. In the fourth embodiment, the first optical axis is perpendicular to the second optical axis. That is, the first direction X is perpendicular to the third direction Y. The first imaging unit 33 is CCD (charge-coupled device) or CMOS (complementary metal oxide semiconductor).

Figure 16:
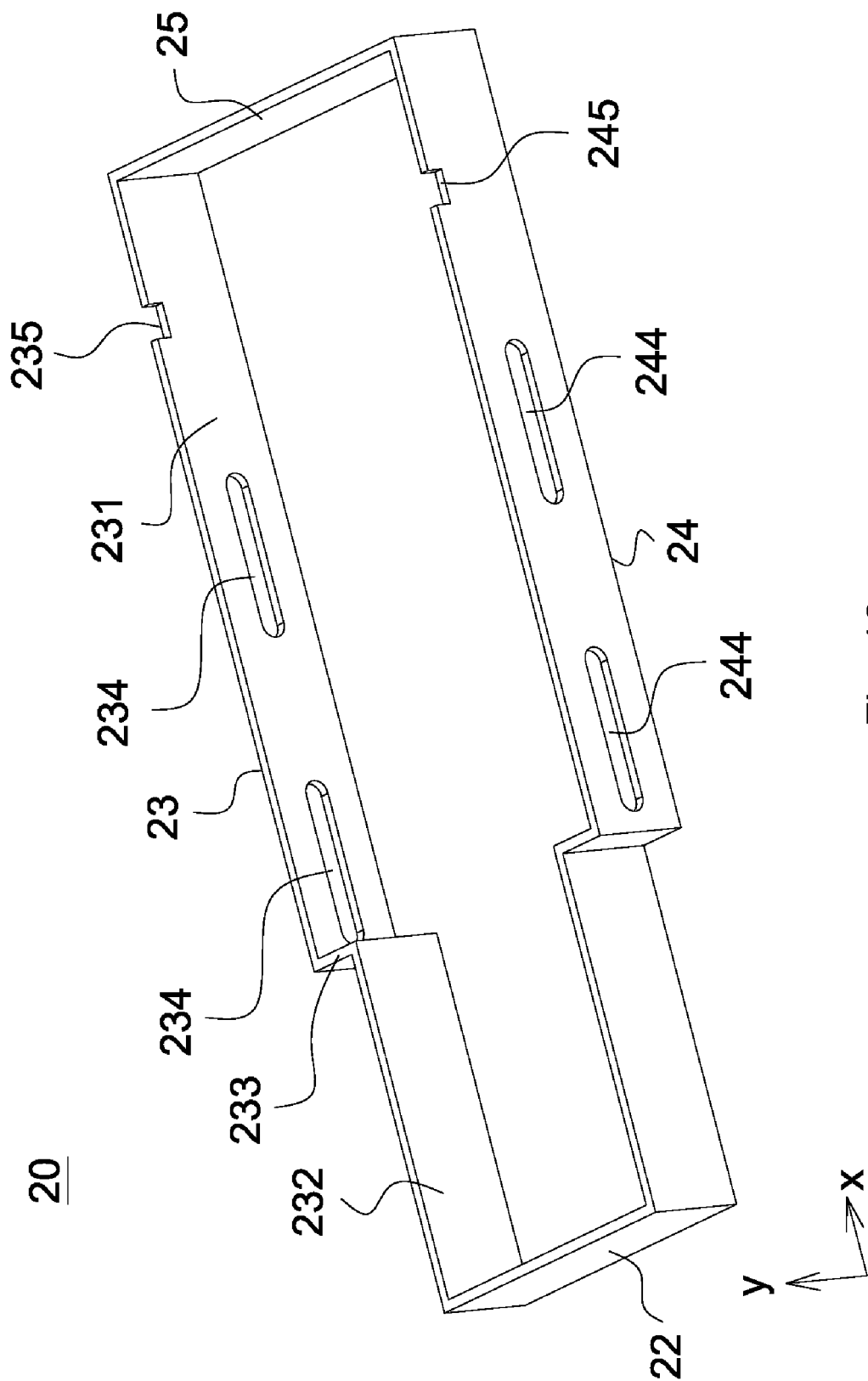
FIG. 16 is a schematic view of a frame body of FIG. 15.

Referring to FIG. 16, the frame body 20 includes a plurality of lateral walls extending in a direction parallel to the second optical axis (that is, the third direction Y) and connected to each other for constituting the accommodating space. In the fourth embodiment, the frame body 20 includes a first lateral wall 25, a second lateral wall 22, a third lateral wall 23 and a fourth lateral wall 24, wherein the first lateral wall 25 is parallel to the second lateral wall 22, the third lateral wall 23 is connected to a first end of the first lateral wall 25 and a first end of the second lateral wall 22, and the fourth lateral wall 24 is connected to a second end of the first lateral wall 25 and a second end of the second lateral wall 22. The first lateral wall 25 is adjacent to the first lens driving module 30, and the second lateral wall 22 is adjacent to the second lens driving module 50. The third lateral wall 23 and the fourth lateral wall 24 are arranged symmetrically about the first optical axis.

In the fourth embodiment, a length of the first lateral wall 25 is greater than a length of the second lateral wall 22. The third lateral wall 23 is bent into angles and includes three parts connected to each other, which are a first lateral wall connecting part 231, a second lateral wall connecting part 232 and an intermediate part 233, wherein the intermediate part 233 is connected to the first lateral wall connecting part 231 and the second lateral wall connecting part 232. The first lateral wall connecting part 231 and the second lateral wall connecting part 232 are parallel to each other and are perpendicular to the intermediate part 233. The first lateral wall connecting part 231 is connected to the first lateral wall 25, and the second lateral wall connecting part 232 is connected to the second lateral wall 22. The fourth lateral wall 24 and the third lateral wall 23 are arranged symmetrically about the first optical axis so that the frame body 20 is 凸-shaped.

In another embodiment, the length of the first lateral wall 25 is smaller than the length of the second lateral wall 22. In yet another embodiment, the length of the first lateral wall 25 is equal to the length of the second lateral wall 22, and the third lateral wall 23 or the fourth lateral wall 24 only includes one part so that the outline of the frame body 20 is rectangular. In another embodiment, the length of the first lateral wall 25 is equal to the length of the second lateral wall 22, and the third lateral wall 23 or the fourth lateral wall 24 includes five parts connected to each other so that the frame body 20 is narrower at the middle and wider at both ends, or wider at the middle and narrower at both ends. It is understood that the invention is not limited to the above description, and the frame body 20 can be in other shapes in order to meet the requirements.

The third lateral wall 23 is provided with a plurality of through holes 234, and the fourth lateral wall 24 is provided with a plurality of through holes 244, wherein the through holes 234 and the through holes 244 are oppositely arranged at two sides of the first lens driving module 30 and the optical turning module 40. When the first lens driving module 30 and the optical turning module 40 are disposed in the accommodating space of the frame body 20, glues can be easily applied to gaps between the first lens driving module 30, the optical turning module 40 and the frame body 20 by means of the through holes 234 and the through holes 244, so as to increase the strength of the camera device. A top surface of the third lateral wall 23 is provided with a cut 235, and a top surface of the fourth lateral wall 24 is provided with a cut 245, wherein a line passing through a center of the cut 235 and a center of the cut 245 is perpendicular to the first optical axis (that is, the first direction X).

The frame body 20 is disposed to surround the first lens driving module 30, the optical turning module 40 and the second lens driving module 50 and is fixed thereto by the glues. Preferably, the frame body 20 is made of metal or alloy in order to have reduced thickness and enhanced strength.

As shown in FIGS. 14, 15 and 17, the first lens driving module 30 includes a first lens unit 31, a first optical element 32, a second fixing element 34, a second carrier 35 and two drivers not shown). The first lens unit 31, the first optical element 32 and the first imaging unit 33 is sequentially arranged along the first optical axis. The first imaging unit 33 is disposed at a side away from the optical turning module 40, that is, adjacent to the first lateral wall 25. The first optical element 32 is an infrared light filter.

The cut 235 and the cut 345 of the frame body 20 are arranged between the first lens unit 31 and the first imaging unit 33. The first lens driving module 30 further includes two fixing members 321 respectively disposed in the cut 235 and the cut 245, and the first optical element 32 is firmly disposed on the frame body 20 through the fixing members 321.

The second fixing element 34 is fixed in the frame body 20. The second carrier 35 is disposed on the second fixing element 34 and is configured to move in a direction parallel to the first optical axis (that is, the first direction X as shown in FIG. 14) and a direction perpendicular to the first optical axis (that is, a second direction Z as shown in FIG. 14). The first lens unit 31 is fixed to the second carrier 35, and a bottom of the first lens unit 31 is disposed in a bottom of the second carrier 35. The second direction Z is perpendicular to the first direction X and the third direction Y. When the second carrier 35 is moved in the first direction X and the second direction Z, the first lens unit 31 is moved with respect to the second fixing element 34. Two sides of the second fixing element 34 are firmly connected to the frame body 20 by the glues.

As shown in FIG. 15, the second fixing element 34 includes a second fixing base 341 and two second fixing bodies 342. The second fixing bodies 342 are connected to two sides of the second fixing base 341 and extend in the first direction X. Each of the second fixing bodies 342 has an internal surface, and two internal surfaces are opposite to each other. Each of the internal surfaces of the second fixing bodies 342 is provided with a sliding groove 3421 extending in the first direction X. The second fixing base 341 is a frame made of metal or alloy. The second fixing bodies 342 are plastic elements and are connected to the second fixing base 341 by insert molding. It is understood that the invention is not limited to the above description, and the second fixing element 34 can be plastic element.

The second carrier 35 includes a top connecting portion 351 and two second carrier bodies 352, wherein the second carrier bodies 352 are connected to two sides of the top connecting portion 351 and extend in the first direction X. The top connecting portion 351 is configured to connect the second carrier bodies 352 so that the top connecting portion 351 and the second carrier bodies 352 are connected. The top connecting portion 351 and the second carrier bodies 352 are arranged around the first lens unit 31 and have a center coinciding with the first optical axis of the first lens unit 31 to form a partial outer circumferential structure of the first lens unit 31. Each of the second carrier bodies 352 has an external surface, and each of the external surfaces of the second carrier bodies 352 is provided with a rib 3521 extending in the first direction X. Two ribs 3521 are respectively engaged with two sliding grooves 3421 of the second fixing bodies 342 and are configured to move in the sliding grooves 3421 in the first direction X. The second carrier 35 has a width in the second direction Z. and the width of the second carrier 35 is smaller than a distance between two second fixing bodies 342 of the second fixing element 34, so that the rib 3521 is movable with respect to the sliding groove 3421 in the second direction Z. For ensuring that the movement of the second carrier 35 is stable, the second fixing element 34 can be modified to have four sliding grooves 3421, and the second carrier 35 can be modified to have four ribs 3521 correspondingly. Each of the sliding grooves 3421 of the second fixing element 34 has two ends, and each of the ends of the sliding groove 3421 is provided with a stopping member (not shown) for constraining the movement of the second carrier 35. The second carrier 35 is provided with an opening portion (not shown) formed on an end surface of the top connecting portion 351 of the second carrier 35. The first lens unit 31 is disposed in the opening portion of the second carrier 35, and an end surface of the first lens unit 31 facing the cover 60 is exposed from the opening portion and is not protruded from the opening portion.

The drivers are configured to drive the second carrier 35 to move with respect to the second fixing element 34 in the first direction X and the second direction Z. Each of the drivers includes a coil (not shown) and a magnet (not shown), wherein the magnet and the coil are disposed oppositely with each other. In another embodiment, each of the drivers is a VCM (voice-coil motor) or a piezoelectric material.

It is understood that the sliding grooves 3421 of the second fixing bodies 342 and the ribs 3521 of the second carrier bodies 352 can be replaced with the clamping portions described in the above embodiments. In another embodiment, each of the second fixing bodies 342 includes two clamping portions (not show therein the clamping portions extend from the second fixing bodies 342 towards the second carrier 35 and are connected to the second carrier 35. Thus, the second carrier 35 is hung and movable between the second fixing bodies 342. Each of the clamping portions is elongated and has a meandering portion so as to be flexible, and the second carrier 35 can be moved in a first direction and a second direction. The first direction is parallel to the first optical axis, and the second direction is perpendicular to the first optical axis and the first direction. Therefore, the second carrier 35 carrying the first lens unit 31 is movably disposed between the second fixing bodies 342 through the clamping portions, and the second carrier 35 is driven to move with respect to the second fixing element 34 in the first direction and the second direction through the drivers. The arrangement of other elements and operation are similar to those of the above embodiment, and therefore the descriptions thereof are omitted.

As shown in FIG. 15, the optical turning module 40 includes a first fixing element 41, a first carrier 42 and an optical turning unit 43. The first fixing element 41 is fixed in the frame body 20. The first carrier 42 is disposed in the first fixing element 41. The optical turning unit 43 is fixed in first carrier 42, has a light entering surface, a light turning surface and a light exiting surface and is configured to change an optical path of a light beam (not shown) travelling in the third direction Y, so that the light beam travels to the light turning surface through the light entering surface for changing the optical path thereof, travels to the first lens driving module 30 through the light exiting surface and forms an image on the first imaging unit 33. The optical turning unit 43 is prism, reflecting mirror, refracting mirror or polarizing mirror.

The second lens driving module 50 includes a second lens unit 501 and a second imaging unit (not shown), wherein the second lens unit 501 and the second imaging unit are arranged in the third direction Y. A light beam (not shown) passes through the second lens unit 501 to form an image on the second imaging unit. In the fourth embodiment, the first lens driving module 30 is a telescopic lens module, and the second lens driving module 50 is a wide-angle lens module.

The cover 60 is configured to cover the first lens driving module 30 and the optical turning module 40 and is provided with a light transmitting opening 61 corresponding to the optical turning unit 43, so that the optical turning unit 43 can be exposed from the light transmitting opening 61 for receiving light.

The camera device further includes an external case (not shown). The external case is connected to the frame body 20 and is configured to cover the accommodating space of the frame body 20 for preventing the camera device from dust or other substances. The external case is provided with two light transmitting openings (not shown) respectively corresponding to the optical turning module 40 and the second lens driving module 50, so that the optical turning unit 43 and the second lens driving module 50 are respectively exposed from the light transmitting openings for receiving light. The external case is firmly connected to the frame body 20 by gluing, fitting, engaging and so on. For gluing, glues are put on contacting parts of the external case and the frame body 20. For fitting, the external case is provided with a protruding portion (not shown), the frame body 20 is correspondingly provided with a depressed portion (not shown), a width of the depressed portion is slightly smaller than a width of the protruding portion, and the protruding portion is fitted in the depressed portion for connecting the external case and the frame body 20. For engaging, the external case is provided with a first hook (not shown), the frame body 20 is correspondingly provided with a second hook (not shown), and the first hook is engaged with the second hook for connecting the external case and the frame body 20.

In the fourth embodiment, the first lens driving module 30, the optical turning module 40 and the second driving module 50 are fixed in the frame body 20 to form a strengthening structure. By such arrangement, the connection between the first lens driving module 30, the optical turning module 40 and the second driving module 50 is enhanced, and the thickness of the camera device can be therefore reduced.

In another embodiment, the optical turning module 40 and the second driving module 50 are arranged in the second direction Z, and the first lens driving module 30 and the optical turning module 40 are arranged in the first direction X. A length of the first lateral wall 25 is smaller than a length of the second lateral wall 22, both the optical turning module 40 and the second driving module 50 are adjacent to the second lateral wall 22, and the first lens driving module 30 is adjacent to the first lateral wall 25, the third lateral wall 23 and the fourth lateral wall 24.

Figure 18:
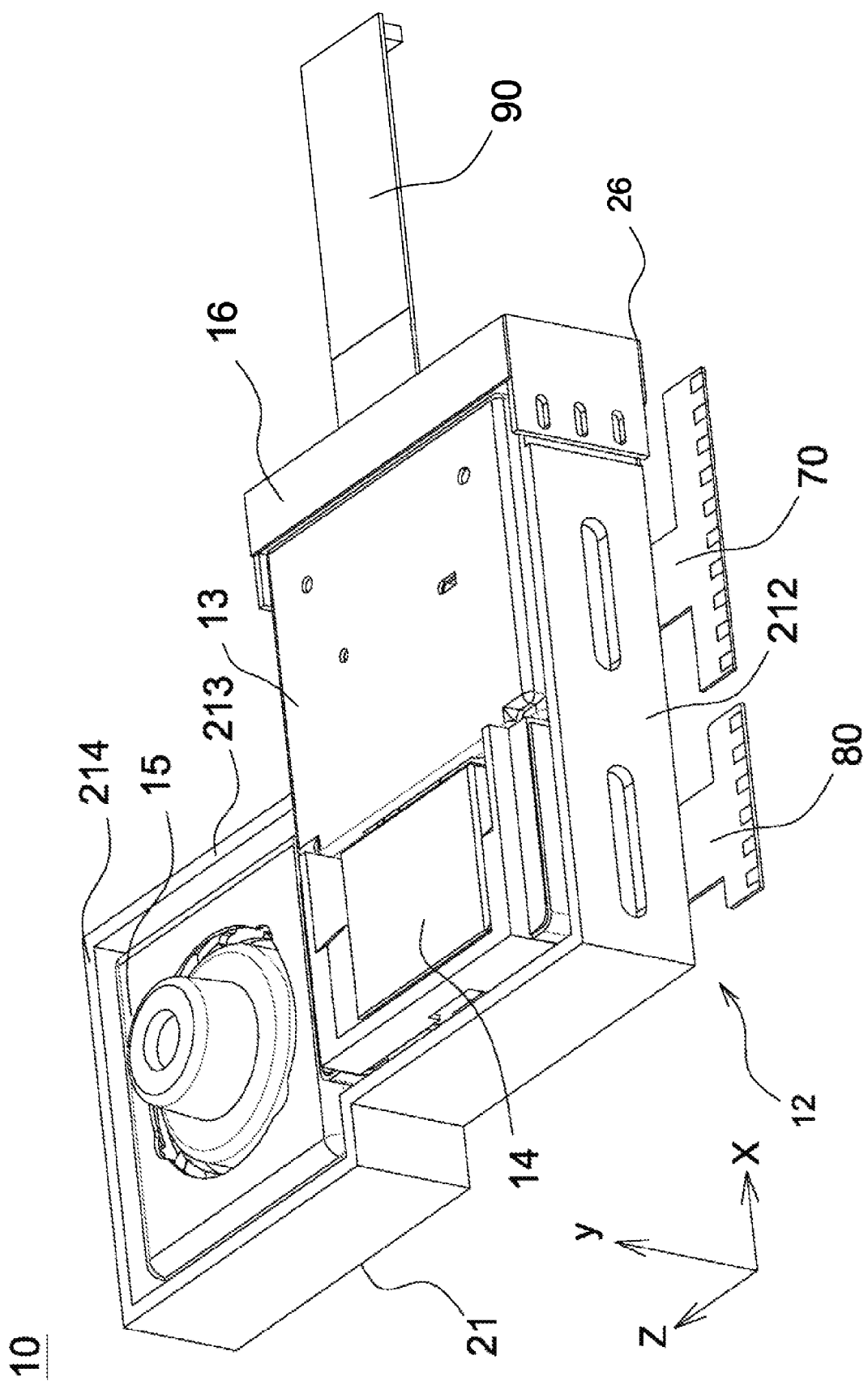
FIG. 18 is a schematic view of a camera device in accordance with a fifth embodiment of the invention.
Figure 19:
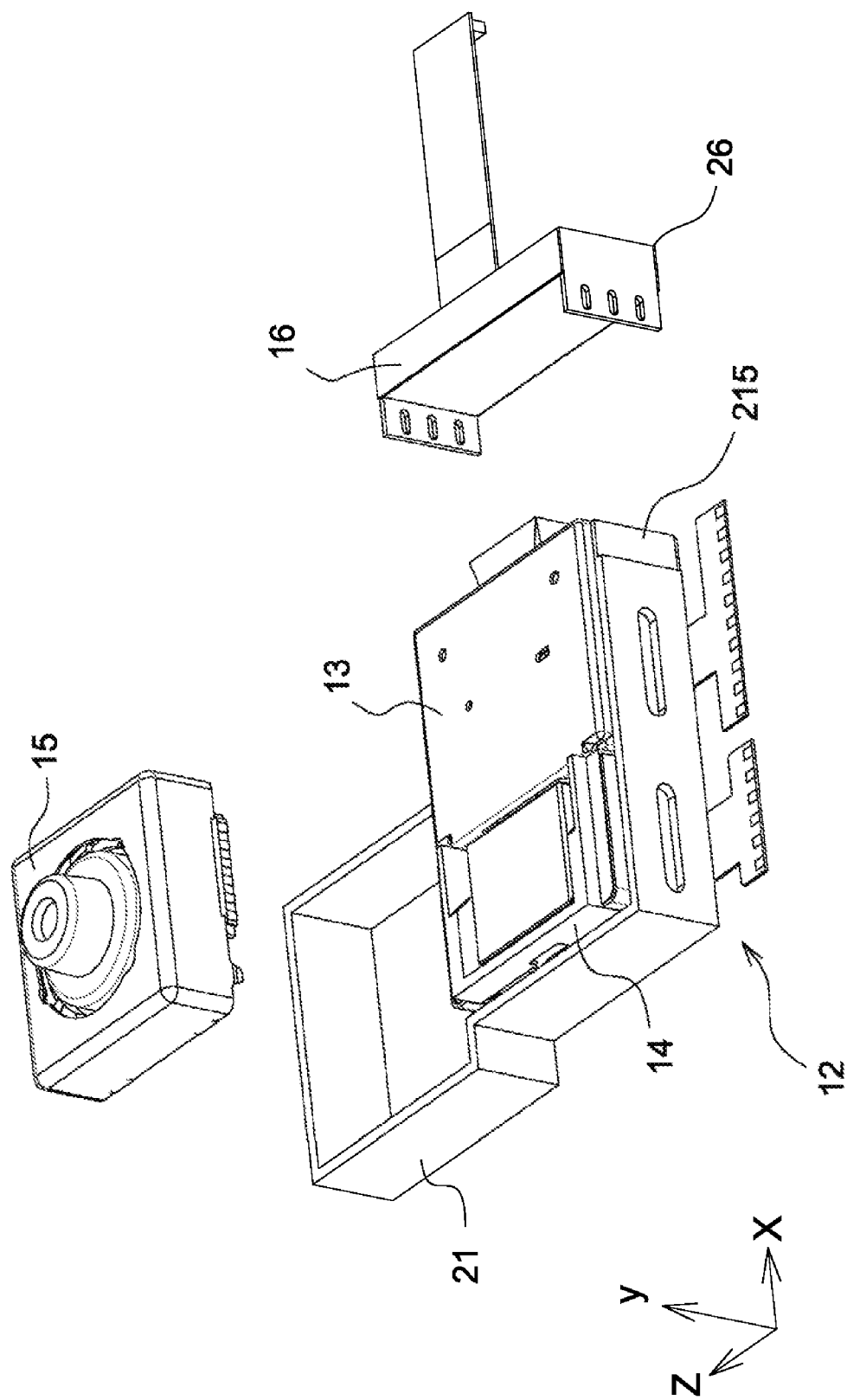
FIG. 19 is an exploded view of the camera device of FIG. 18.

Referring to FIGS. 18 and 19, a camera device 10 in accordance with a fifth embodiment of the invention includes a first imaging module 16, a frame body 12, a first lens driving module 13, an optical turning module 14 and a second lens driving module 15. The difference between the fifth embodiment and the above embodiments is the arrangement of the first lens driving module 13, the optical turning module 14 and the second lens driving module 15 as well as the structure of the frame body 12.

Figure 20:
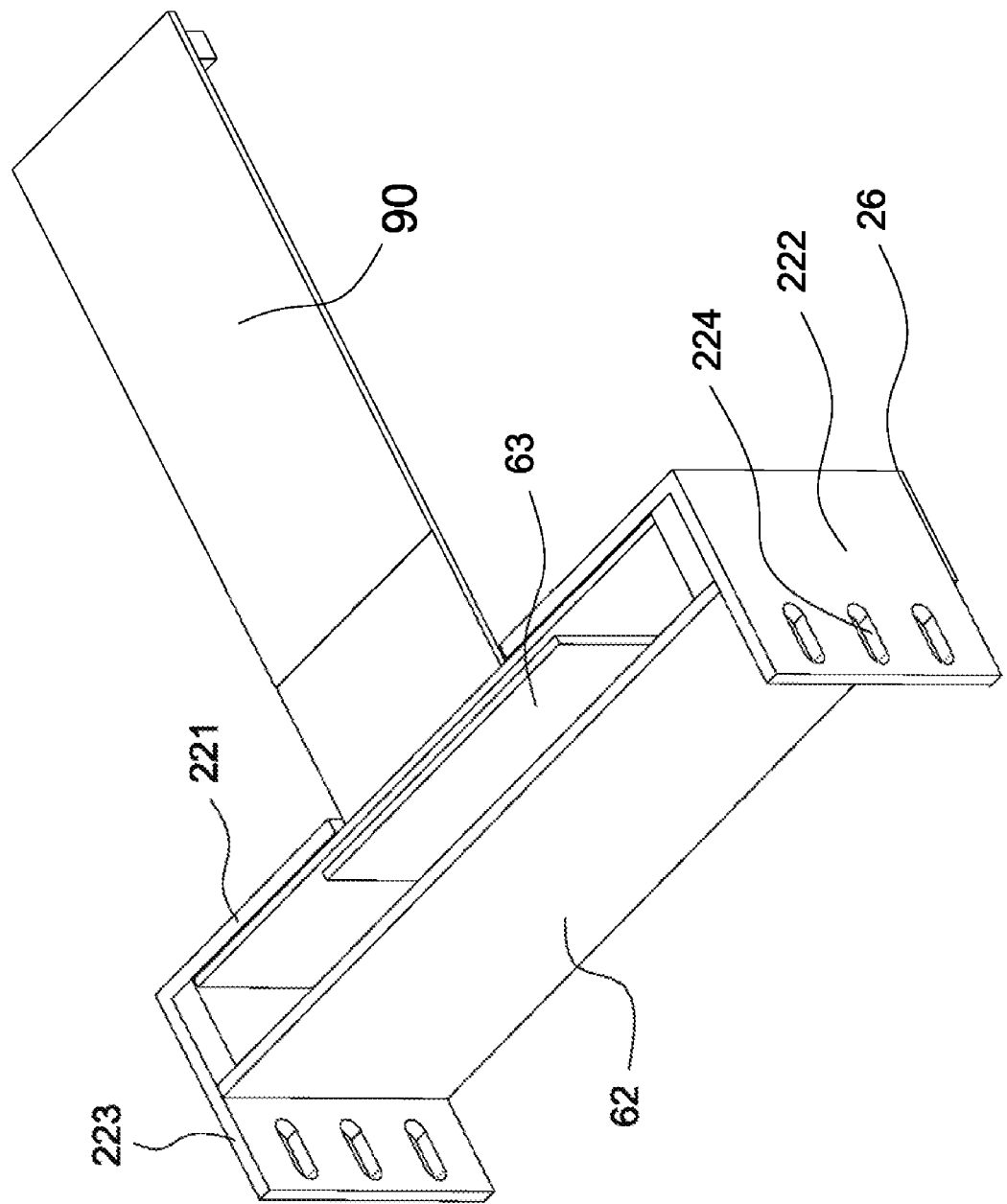
FIG. 20 is a schematic view of a second portion of FIG. 18.

As shown in FIG. 18, the first imaging module 16, the first lens driving module 13 and the optical turning module 14 are arranged in a first direction X, and the optical turning module 14 and the second lens driving module 15 are arranged in a second direction Z. Therefore, the frame body 12 is substantially L-shape. The frame body 12 includes a first portion 21 and a second portion 26, wherein the first portion 21 is connected to the second portion 26. The first portion 21 is configured to accommodate the first lens driving module 13, the optical turning module 14 and the second lens driving module 15, and the second portion 26 is configured to accommodate and fix the first imaging module 16. Referring to FIG. 20, the first imaging module 16 includes a first imaging unit 63 and a light filtering unit 62.

Figure 21:
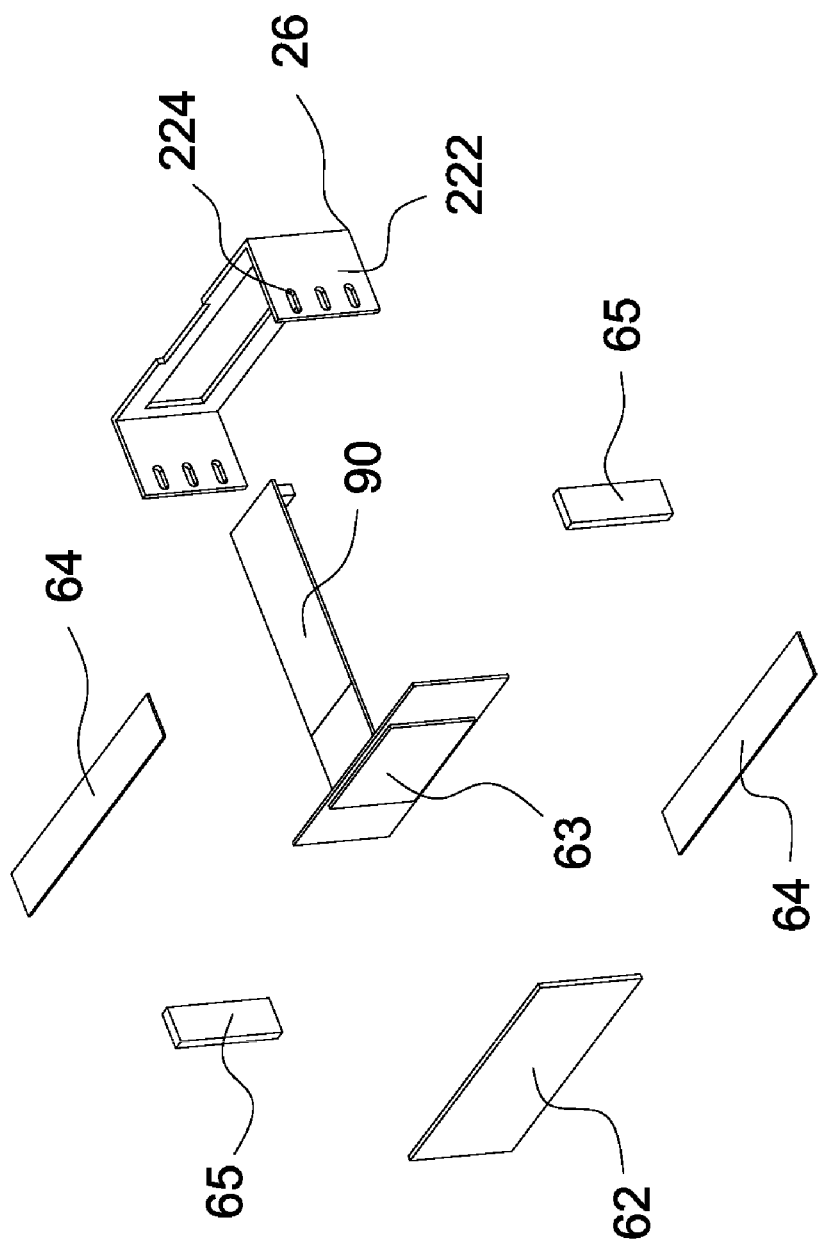
FIG. 21 is an exploded view of the second portion of FIG. 18.

The first portion 21 includes a second lateral wall 214, a third lateral wall 213 and a fourth lateral wall 212. The second lateral wall 214 is perpendicular to the second direction Z and is adjacent to the second lens driving module 15. The fourth lateral wall 212 and the third lateral wall 213 are different to each other and are respectively connected to two ends of the second lateral wall 214 for forming a first opening end. Referring to FIGS. 20 and 21, the second portion 26 includes a first lateral wall 221, a fifth lateral wall 222, a sixth lateral wall 223, two shielding plates 64 and two spacing plates 65. The first lateral wall 221 is perpendicular to the first direction X and is adjacent to the first imaging unit 63. The fifth lateral wall 222 and the sixth lateral wall 223 are symmetrical to each other and are respectively connected to two ends of the first lateral wall 221 for forming a second opening end. The spacing plates 65 are respectively disposed on both inner surfaces of the fifth lateral wall 222 and the sixth lateral wall 223 and are placed against the first lateral wall 221 and the light filtering unit 62, so that the light filtering unit 62 and the first imaging unit 63 are spaced apart at a predetermined distance. The shielding plates 54 respectively extend from a top and a bottom of the first lateral wall 221 to the light filtering unit 62 and contact the first lens driving module 13, so as to eliminate clearances between the first lens driving module 13 and the first imaging module 16 and to avoid entry of stray light and dust.

As shown in FIG. 18 again, the first opening end of the first portion 21 and the second opening end of the second portion 26 are connected to each other. Each of outer surfaces (that is, both outer surfaces of the fourth lateral wall 212 and the third lateral wall 213) of the first opening end of the first portion 21 is provided with a flange 215 configured to connect to the second portion 26. As shown in FIG. 20, each of lateral walls (that is, the fifth lateral wall 222 and the sixth lateral wall 223) of the second opening end of the second portion 26 is provided with a through hole 224. When the second opening end of the second portion 26 is connected to the flange 215, the first opening end of the first portion 21 and the second opening end of the second portion 26 are fixed by putting glues into the through hole 224. In another embodiment, each of outer surfaces of the second opening end of the second portion 26 is provided with the flange 215, and each of lateral walls of the first opening end of the first portion 21 is provided with the through hole 224.

In the fifth embodiment, the frame body 12 is constituted by the first portion 21 and the second portion 26. By such arrangement, the second portion 26 can be moved with respect to the first portion 21 in the first direction X and a third direction Y (as shown in FIG. 18) for an adjustment to avoid a poor image formed on the first imaging module 16 arising from the assembly error of the camera device 10. After the adjustment is completed, the second portion 26 and the first portion 21 are firmly connected to each other by gluing. In the fifth embodiment, the second direction Z is perpendicular to the first direction X and the third direction Y.

As shown in FIG. 18, the camera device 10 further includes a first flexible printed circuit board 70, a second flexible printed circuit board 80 and a third flexible printed circuit board 90. The first flexible printed circuit board 70 is electrically connected to the first lens driving module 13, the second flexible printed circuit board 80 is electrically connected to the optical turning module 14, and the third flexible printed circuit board 90 is electrically connected to the first imaging module 16. The first lens driving module 13 includes a first lens unit (not shown), a driver (not shown) and a controller (not show wherein the first flexible printed circuit board 70 is electrically connected to the driver and the controller, so as to drive the first lens unit to move in the first direction X and the second direction Z for adjustment. The optical turning module 14 includes an optical turning unit (not shown), a driver (not shown) and a controller (not shown), wherein the second flexible printed circuit board 80 is electrically connected to the driver and the controller, so as to drive the optical turning unit to rotate about the second direction Z for adjusting an angle of the optical turning unit. The third flexible printed circuit board 90 is configured to electrically connect the first imaging unit 63 to a signal processor (not shown), so as to transmit an image captured by the camera device 10. As shown in FIG. 20, the third flexible printed circuit board 90 penetrates through the first lateral wall 221. It is worth noting that the first flexible printed circuit board 70 and the second flexible printed circuit board 80 cover both bottoms of the first lens driving module 13 and the optical turning module 14, so as to prevent the camera device 10 from entry of dust.

What is claimed is:

1. A camera device, comprising:
a first lens driving module comprising a first lens unit, a first carrier, a first fixing element, a plurality of clamping portions and a driver;
wherein the first lens unit comprises at least one lens, and the lens constitutes a first optical axis;
wherein the first carrier is configured to carry the first lens unit and comprises a plurality of first carrier bodies and a first carrier base;
wherein the first fixing element comprises a plurality of first fixing bodies and a first fixing base, and the first fixing bodies are connected to the first fixing base;
wherein the clamping portions extend from the first fixing bodies towards the first carrier and are connected to the first carrier;
wherein the driver is disposed between the first carrier and the first fixing element and is configured to drive the first carrier carrying the first lens unit to move with respect to the first fixing element in a first direction and a second direction;
wherein the first direction is parallel to the first optical axis, and the second direction is perpendicular to the first direction.

2. The camera device as claimed in claim 1, wherein the first fixing base has an accommodating space greater than the first carrier base, and the first carrier base is disposed in the first fixing base;
wherein the first fixing base and the first carrier bodies are arranged around the first lens unit and have a center coinciding with the first optical axis to form a partial outer circumferential structure of the first lens unit.

3. The camera device as claimed in claim 2, wherein the clamping portions are elongated and flexible, and the first carrier is movably connected to the first fixing element through the clamping portions.

4. The camera device as claimed in claim 3, wherein the first lens driving module further comprises a connecting unit, and each of the first fixing bodies comprises a main body, a lateral plate, a frontal plate and a back plate;
wherein the lateral plate extends upwards from the main body, and the frontal plate and the back plate respectively extend from two ends of the main body and the lateral plate towards another of the first fixing bodies;
wherein the frontal plate is provided with a hole, the back plate is provided with a hole, each of the first carrier bodies is provided with a long cut or a through hole, and the connecting unit sequentially passes through the hole of the frontal plate, the long cut or the through hole of the first carrier body, and the hole of the back plate;
wherein the long cut or the through hole is configured to move with respect to the connecting unit in the first and the second directions.

5. The camera device as claimed in claim 2, wherein the first fixing bodies and the first fixing base are connected as one piece by insert molding;
wherein the first fixing base comprises a first frame portion and a first connecting portion, the first frame portion is a frame, and the first connecting portion extends upwards from the first frame portion and is connected to the first fixing bodies;
wherein the first carrier bodies and the first carrier base are connected as one piece by insert molding;
wherein the first carrier base comprises a second frame portion and a second connecting portion, the second frame portion is a frame, and the second connecting portion extends upwards from the second frame portion and is connected to the first carrier bodies;
wherein the second frame portion is disposed in the first frame portion, and a bottom of the first lens unit is disposed in the second frame portion.

6. The camera device as claimed in claim 5, further comprising an optical turning module comprising an optical turning unit and a second carrier, wherein the optical turning unit is firmly disposed on the second carrier;
wherein the first fixing base further comprises a third frame portion connected to the first frame portion as one piece, the first fixing bodies comprises a plurality of first fixing portions connected to the first frame portion and a plurality of second fixing portions connected to the third frame portion;
wherein the first carrier is connected to the first fixing portions and is configured to move with respect to the first fixing portions in the first direction and the second direction, and the second carrier is disposed on the second fixing portions.

7. The camera device as claimed in claim 6, wherein the number of the first fixing portions is two, and the first fixing portions are firmly connected to the first frame portion with respect to each other;
wherein the number of the second fixing portions is two, and the second fixing portions are firmly connected to the third frame portion with respect to each other;
wherein one of the second fixing portions and one of the first fixing portions are formed as one piece on the same side.

8. A camera device comprising:
a first lens driving module comprising a first lens unit, a first carrier, a first fixing element, a plurality of clamping portions and a driver wherein the first lens unit comprises at least one lens, and the lens constitutes a first optical axis;
a second lens driving module having a second optical axis perpendicular to the first optical axis;
an optical turning module configured to change an optical path of a light beam travelling along the second optical axis for allowing the light beam to reach the first lens driving module and connected to the first lens driving module;

a frame body comprising a plurality of lateral walls, a first lateral wall and a second lateral wall, wherein the lateral walls extend in a direction parallel to the second optical axis, and the first lateral wall and the second lateral wall are arranged along the first optical axis and opposite to each other; and a first imaging unit adjacent to the first lateral wall, wherein the first imaging unit, the first lens driving module, the optical turning module and the second lens driving module are firmly disposed in the frame body;

wherein the first carrier is configured to carry the first lens unit and comprises a plurality of first carrier bodies and a first carrier base;

wherein the first fixing element comprises a plurality of first fixing bodies and a first fixing base, and the first fixing bodies are connected to the first fixing base;

wherein the clamping portions extend from the first fixing bodies towards the first carrier and are connected to the first carrier;

wherein the driver is disposed between the first carrier and the first fixing element and is configured to drive the first carrier carrying the first lens unit to move with respect to the first fixing element in a first direction and a second direction;

wherein the first direction is parallel to the first optical axis, and the second direction is perpendicular to the first direction.

9. The camera device as claimed in claim 8, wherein the first imaging unit, the first lens driving module, the optical turning module and the second lens driving module are arranged along the first optical axis from the first lateral wall to the second lateral wall.

10. The camera device as claimed in claim 8, wherein the first imaging unit, the first lens driving module and the optical turning module are arranged along the first optical axis, the second lens driving module and the optical turning module are arranged in a third direction, and the third direction is perpendicular to the first optical axis and the second optical axis.

11. The camera device as claimed in claim 8, wherein the frame body further comprises a third lateral wall and a fourth lateral wall, the third lateral wall is connected to a first end of the first lateral wall and a first end of the second lateral wall, the fourth lateral wall is connected to a second end of the first lateral wall and a second end of the second lateral wall, the first lateral wall and the second lateral wall are perpendicular to the first optical axis, and the third lateral wall and the fourth lateral wall are arranged symmetrically about the first optical axis;

wherein the third lateral wall and the fourth lateral wall are provided with a plurality of through holes, and the through holes are oppositely arranged at two sides of the first lens driving module and the optical turning module;

wherein a top surface of the third lateral wall is provided with a cut, a top surface of the fourth lateral wall is provided with another cut, wherein a line passing through two centers of the cuts is perpendicular to the first optical axis;

wherein the first lens driving module further comprises a first optical element and two fixing members respectively disposed in the cuts, and the first optical element is disposed between the first lens unit and the first imaging unit and is fixed in the frame body through the fixing members;

wherein the frame body is 凸-shaped, and the frame body surrounds the first imaging unit, the first lens driving module, the optical turning module and the second lens driving module.

12. The camera device as claimed in claim 8, wherein the frame body comprises a first portion and a second portion, the first portion is configured to accommodate the first lens driving module, the optical turning module and the second driving module, and the second portion is configured to accommodate the first imaging unit.

13. The camera device as claimed in claim 12, wherein the first portion has a first opening end, the second portion has a second opening end, and the first opening end is connected to the second opening end;

wherein the first portion includes the second lateral wall, a third lateral wall and a fourth lateral wall, the third lateral wall and the fourth lateral wall are respectively connected to two ends of the second lateral wall, and the second lateral wall is adjacent to the second lens driving module;

wherein the second portion includes the first lateral wall, a fifth lateral wall and a sixth lateral wall, and the fifth lateral wall and the sixth lateral wall are respectively connected to two ends of the first lateral wall.

14. The camera device as claimed in claim 12, wherein the first lens driving module further comprises a first optical element disposed between the first lens unit and the first imaging unit and accommodated by the second portion.

15. The camera device as claimed in claim 12, wherein the first imaging unit, the first lens driving module, the optical turning module and the second lens driving module are arranged along the first optical axis from the first lateral wall to the second lateral wall.

16. The camera device as claimed in claim 12, wherein the first imaging unit, the first lens driving module and the optical turning module are arranged along the first optical axis, the second lens driving module and the optical turning module are arranged in a third direction, and the third direction is perpendicular to the first optical axis and the second optical axis.

17. A camera device, comprising:
a first lens driving module comprising a first lens unit, a first carrier, a first fixing element, a plurality of clamping portions and a driver;
wherein the first lens unit constitutes a first optical axis;
wherein the first carrier is configured to carry the first lens unit and comprises a plurality of first carrier bodies and a first carrier base;
wherein the first fixing element comprises a plurality of first fixing bodies and a first fixing base, the first fixing base has an accommodating space greater than the first carrier base, and the first carrier base is disposed in the first fixing base;
wherein the clamping portions extend from the first fixing bodies towards the first carrier and are connected to the first carrier;
wherein the driver is configured to drive the first carrier to move with respect to the first fixing element in a first direction and a second direction, the first direction is parallel to the first optical axis, and the second direction is perpendicular to the first direction.

18. The camera device as claimed in claim 17, further comprising:
a second lens driving module having a second optical axis perpendicular to the first optical axis;

an optical turning module configured to change an optical path of a light beam travelling along the second optical axis for allowing the light beam to reach the first lens driving module and connected to the first lens driving module;
a frame body comprising a plurality of lateral walls, a first lateral wall and the second lateral wall, wherein the lateral walls extend in a direction parallel to the second optical axis, and the first lateral wall and the second lateral wall are arranged along the first optical axis and opposite to each other; and
a first imaging unit adjacent to the first lateral wall, wherein the first imaging unit, the first lens driving module, the optical turning module and the second lens driving module are firmly disposed in the frame body;
wherein the frame body further comprises a third lateral wall and a fourth lateral wall, the third lateral wall is connected to a first end of the first lateral wall and a first end of the second lateral wall, the fourth lateral wall is connected to a second end of the first lateral wall and a second end of the second lateral wall, the first lateral wall and the second lateral wall are perpendicular to the first optical axis, and the third lateral wall and the fourth lateral wall are arranged symmetrically about the first optical axis;
wherein the third lateral wall and the fourth lateral wall are provided with a plurality of through holes, and the through holes are oppositely arranged at two sides of the first lens driving module and the optical turning module;
wherein a top surface of the third lateral wall is provided with a cut, a top surface of the fourth lateral wall is provided with another cut, wherein a line passing through two centers of the cuts is perpendicular to the first optical axis;
wherein the first lens driving module further comprises a first optical element and two fixing members respectively disposed in the cuts, and the first optical element is disposed between the first lens unit and the first imaging unit and is fixed in the frame body through the fixing members;
wherein the frame body is -shaped, and the frame body surrounds the first imaging unit, the first lens driving module, the optical turning module and the second lens driving module.

19. The camera device as claimed in claim 17, wherein the clamping portions are elongated and flexible, and the first carrier is movably connected to the first fixing element through the clamping portions;
wherein the first fixing base and the first carrier bodies are arranged around the first lens unit and have a center coinciding with the first optical axis to form a partial outer circumferential structure of the first lens unit;
wherein the first lens driving module further comprises a connecting unit, each of the first fixing bodies comprises a main body, a lateral plate, a frontal plate and a back plate;
wherein the lateral plate extends upwards from the main body, and the frontal plate and the back plate respectively extend from two ends of the main body and the lateral plate towards another of the first fixing bodies;
wherein the frontal plate is provided with a hole, the back plate is provided with a hole, each of the first carrier bodies is provided with a long cut or a through hole, and the connecting unit sequentially passes through the hole of the frontal plate, the long cut or the through hole of the first carrier body, and the hole of the back plate;
wherein the long cut or the through hole is configured to move with respect to the connecting unit in the first and the second direction;
wherein the first fixing bodies and the first fixing base are connected as one piece by insert molding;
wherein the first fixing base comprises a first frame portion and a first connecting portion, the first frame portion is a frame, and the first connecting portion extends upwards from the first frame portion and is connected to the first fixing bodies;
wherein the first carrier bodies and the first carrier base are connected as one piece by insert molding;
wherein the first carrier base comprises a second frame portion and a second connecting portion, the second frame portion is a frame, and the second connecting portion extends upwards from the second frame portion and is connected to the first carrier bodies;
wherein the second frame portion is disposed in the first frame portion, and a bottom of the first lens unit is disposed in the second frame portion.

20. The camera device as claimed in claim 19, further comprising an optical turning module comprising an optical turning unit and a second carrier, wherein the optical turning unit is firmly disposed on the second carrier;
wherein the first fixing base further comprises a third frame portion connected to the first frame portion as one piece, the first fixing bodies comprises a plurality of first fixing portions connected to the first frame portion and a plurality of second fixing portions connected to the third frame portion;
wherein the first carrier is connected to the first fixing portions and is configured to move with respect to the first fixing portions in the first direction and the second direction, and the second carrier is disposed on the second fixing portions;
wherein the number of the first fixing portions is two, and the first fixing portions are firmly connected to the first frame portion with respect to each other;
wherein the number of the second fixing portions is two, and the second fixing portions are firmly connected to the third frame portion with respect to each other;
wherein one of the second fixing portions and one of the first fixing portions are formed as one piece on the same side.

* * * * *